United States Patent
Gao et al.

(10) Patent No.: US 9,480,023 B2
(45) Date of Patent: Oct. 25, 2016

(54) UPLINK POWER CONTROL METHOD AND DEVICE

(71) Applicant: CHINA ACADEMY OF TELECOMMUNICATIONS TECHNOLOGY, Beijing (CN)

(72) Inventors: Xuejuan Gao, Beijing (CN); Yanan Lin, Beijing (CN); Zukang Shen, Beijing (CN); Xueming Pan, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 14/363,782

(22) PCT Filed: Sep. 21, 2012

(86) PCT No.: PCT/CN2012/081713
§ 371 (c)(1),
(2) Date: Jun. 6, 2014

(87) PCT Pub. No.: WO2013/082962
PCT Pub. Date: Jun. 13, 2013

(65) Prior Publication Data
US 2014/0329555 A1 Nov. 6, 2014

(30) Foreign Application Priority Data
Dec. 8, 2011 (CN) .......................... 2011 1 0405321

(51) Int. Cl.
*H04B 7/00* (2006.01)
*H04W 52/14* (2009.01)
(Continued)

(52) U.S. Cl.
CPC ......... *H04W 52/146* (2013.01); *H04W 52/246* (2013.01); *H04W 52/34* (2013.01);
(Continued)

(58) Field of Classification Search
None
See application file for complete search history.

(56) References Cited

U.S. PATENT DOCUMENTS

| 2011/0274064 A1 | 11/2011 | Luo et al. |
| 2011/0275335 A1* | 11/2011 | Luo ..................... H04W 52/281 455/127.1 |

FOREIGN PATENT DOCUMENTS

| CN | 102149182 A | 8/2011 |
| CN | 102196547 A | 9/2011 |

(Continued)

OTHER PUBLICATIONS

PCT International Search Report for PCT Counterpart Application No. PCT/CN2012/081713, 5 pgs. (including English translation), (Jan. 3, 2013).

(Continued)

*Primary Examiner* — Mohammed Rachedine
(74) *Attorney, Agent, or Firm* — Blakely, Sokoloff, Taylor & Zafman LLP

(57) ABSTRACT

Disclosed is an uplink power control method, which is used for realizing power control over uplink channels with different uplink transmission times so as to ensure that the total transmit power of terminal equipment in a sub-frame does not exceed maximum transmit power and that a system can work normally. The method comprises the following steps: the terminal equipment determines the target transmit power of each uplink channel/signal transmitted in a current uplink sub-frame; the terminal equipment divides the transmission time of the uplink channels/signals in the current uplink sub-frame into a plurality of transmission time buckets, wherein the uplink channels/signals at any moment in each transmission time bucket are the same, and the uplink channels/signals in each transmission time bucket are not exactly the same as those in the other transmission time buckets; and in each transmission time bucket, the terminal equipment performs the power control on the target transmit power of the uplink channels/signals transmitted in the transmission time bucket to ensure that the transmit power sum of the uplink channels/signals transmitted in the transmission time bucket does not exceed the preset maximum transmit power of the terminal equipment after the power control. Also disclosed a device for implementing the method.

14 Claims, 3 Drawing Sheets

(51) Int. Cl.
*H04W 52/24* (2009.01)
*H04W 52/34* (2009.01)
*H04W 52/36* (2009.01)
*H04W 52/28* (2009.01)
*H04W 52/32* (2009.01)
*H04W 56/00* (2009.01)
*H04L 5/00* (2006.01)

(52) U.S. Cl.
CPC ............ *H04W52/367* (2013.01); *H04L 5/001* (2013.01); *H04L 5/0044* (2013.01); *H04L 5/0053* (2013.01); *H04W 52/281* (2013.01); *H04W 52/325* (2013.01); *H04W 56/0005* (2013.01)

(56) References Cited

FOREIGN PATENT DOCUMENTS

| | | |
|---|---|---|
| CN | 102238716 A | 11/2011 |
| CN | 102573030 A | 7/2012 |
| EP | 2 745 581 A1 | 6/2014 |

OTHER PUBLICATIONS

PCT Written Opinion of the International Searching Authority for PCT Counterpart Application No. PCT/CN2012/081713, 9 pgs. (including English translation), (Jan. 3, 2013).

European Patent Office Communication enclosing Extended European Search Report for corresponding European Patent Application No. 12855295.7, 7 pages, (Aug. 22, 2014).

NTT DOCOMO, "Issues on UL Simultaneous Transmission for Multiple TA", 3GPP TSG RAN WG1 Meeting #67, R1-114070, San Francisco, USA, 3 pages, (Nov. 14-18, 2011).

Ericsson, et al., "Views on UL control enhancements for CA", 3GPP TSG-RAN WG1 #67, R1-113671, San Francisco, USA, 5 pages, (Nov. 14-18, 2011).

European Patent Office Communication enclosing the Office Action for corresponding European Patent Application No. 12855295.7, 7 pp., (Mar. 31, 2016).

Office Action for corresponding Korean Patent Application No. 10-2014-7018916, 5 pp., (Jun. 3, 2015).

Catt, "Simultaneous Transmission of Multiple Uplink Channels in LTE-A Rel-11", 3GPP TSG RAN WG1 Meeting #67, R1-113721, San Francisco, USA, 3 pp., (Nov. 14-18, 2011).

Alcatel-Lucent, et al., "Multiple Timing Advances for Carrier Aggregation", 3GPP TSG RAN WG1 Meeting #66bis, R1-113314, Zhuhai, China, 4 pp., (Oct. 10-14, 2011).

PCT Notification Concerning Transmittal of International Preliminary Report on Patentability (Chapter I of the Patent Cooperation Treaty) for PCT Counterpart Application No. PCT/CN2012/081713, 15 pp. (including English translation), (Jun. 19, 2014).

European Patent Office Communication enclosing Office Action for corresponding European Patent Application No. 12855295.7, 9 pages, (Jun. 10, 2015).

* cited by examiner

UPLINK POWER CONTROL METHOD AND DEVICE

CROSS-REFERENCE TO RELATED APPLICATIONS

This patent application is a U.S. National Stage Application under 35 U.S.C. §371 of International Application No. PCT/CN2012/081713, filed on Sept. 21, 2012, designating the United States, entitled UPLINK POWER CONTROL METHOD AND DEVICE, and claiming the benefit of Chinese Patent Application No. 201110405321.6, filed with the State Intellectual Property Office of People's Republic of China on Dec. 8, 2011 and entitled "Method and apparatus for controlling uplink power", the content of which was incorporated by reference in its entirety.

FIELD

The present invention relates to the field of communications and particularly to a method and apparatus for controlling uplink power.

BACKGROUND

In a Long Term Evolution (LTE) system, uplink power control is one of primary means to ensure a communication quality. Uplink power control can be performed to lower interference as much as possible between User Equipments (UEs) transmitting data over the same resource in adjacent cells and to ensure transmit power of the UEs to be used reasonably.

Uplink power to be controlled generally includes transmit power of a Physical Uplink Control Channel (PUCCH), transmit power of a Physical Uplink Shared Channel (PUSCH), transmit power of a Sounding Reference Signal (SRS) and transmit power of a Physical Random Access Channel (PRACH).

In the Long Term Evolution-Advanced (LTE-A) Release 10 (Rel-10), transmit power $P_{PUCCH}$ at which a UE transmits a PUCCH over a primary carrier is calculated in the equation of:

$$P_{PUCCH}(i) = \min\left\{\begin{array}{l}P_{CMAX,c}(i),\\ P_{0\_PUCCH} + PL_c + h(n_{CQI}, n_{HARQ}, n_{SR}) + \Delta_{F\_PUCCH}(F) + \Delta_{TxD}(F') + g(i)\end{array}\right\}$$

$[dBm]$,

Wherein: $P_{CMAX,c}(i)$ represents maximum allowable carrier transmit power configured for a carrier c in a sub-frame i. The parameter $\Delta_{F\_PUCCH}(F)$ is configured by a higher layer and corresponds to a power offset of a different PUCCH format relative to the PUCCH format 1a. $\Delta_{TxD}(F')$ represents a power offset of transmit diversity, and if the UE is configured to transmit via a two-antenna port, then $\Delta_{TxD}(F')$ is configured for the different PUCCH format by higher-layer signaling and takes its value in a set of $\{0, -2\}$dB; and if the UE is configured to transmit via a single-antenna port, then $\Delta_{TxD}(F')=0$. $h(n_{CQI}, n_{HARQ}, n_{SR})$ represents a power offset related to the number of bits carried on the PUCCH, wherein $n_{CQI}$, represents the number of carried Channel State Information (CSI) bits, $n_{HARQ}$ represents the number of carried Acknowledgement (ACK)/NACK (Non-Acknowledgement) bits, and $n_{SR}$ represents the number of carried Scheduling Request (SR) bits. $P_{O\_PUCCH}$ represents an expected target power value, of the PUCCH, configured by higher-layer signaling. $g(i)$ represents a cumulative value of a power control command, and $$g(i) = g(i-1) + \sum_{m=0}^{M-1} \delta_{PUCCH}(i-k_m),$$

wherein $\delta_{PUCCH}$ represents a UE-specific revision value, also referred to a Transmit Power Control (TPC) command, $\delta_{PUCCH}(i-k_m)$ represents a revision value obtained in a sub-frame $i-k_m$, and for a Time Division Duplex (TDD) system, $k_m$ represents the index of a downlink sub-frame in a set of downlink sub-frames for which an ACK/NACK feedback is needed in the current sub-frame, and M represents the number of downlink sub-frames in the set of downlink sub-frames, and for a Frequency Division Duplex (FDD) system, $k_{m=4}$ and M=1. $PL_c$ represents a path loss of the carrier c measured by the UE and can be measured by the UE, as configured by higher-layer signaling, over a pair of carriers or the primary carrier configured by information in the System Information Block 2.

In the LTE-A Rel-10, if a UE transmits no PUCCH over a carrier c in a sub-frame i, then transmit power $P_{PUSCH,c}(i)$ at which the UE transmits a PUSCH over the carrier c is calculated in the equation of:

$$P_{PUSCH,c}(i) = \min\left\{\begin{array}{l}P_{CMAX,c}(i),\\ 10\log_{10}(M_{PUSCH,c}(i)) + P_{O\_PUSCH,c}(j) + \alpha_c(j) \cdot PL_c + \Delta_{TF,c}(i) + f_c(i)\end{array}\right\}$$

$[dBm]$,

In the LTE-A Rel-10, if a UE transmits a PUCCH over a carrier c in a sub-frame i, then transmit power $P_{PUSCH,c}(i)$ at which the UE transmits a PUSCH over the carrier c is calculated in the equation of:

$$P_{PUSCH,c}(i) = \min\left\{\begin{array}{l}10\log_{10}(\hat{P}_{CMAX,c}(i) - \hat{P}_{PUCCH}(i)),\\ 10\log_{10}(M_{PUSCH,c}(i)) + P_{O\_PUSCH,c}(j) + \alpha_c(j) \cdot PL_c + \Delta_{TF,c}(i) + f_c(i)\end{array}\right\}$$

$[dBm]$,

Wherein: $\hat{P}_{CMAX,c}(i)$ represents a linearity-domain value of $P_{CMAX,c}(i)$, i.e., $\hat{P}_{CMAX,c}(i)=10^{P_{CMAX,c}(i)/10}$. $\hat{P}_{PUCCH}(i)$ represents a linearity-domain value of the PUCCH transmit power $P_{PUCCH}(i)$. $M_{PUSCH,c}(i)$ represents the size, in Resource Blocks (RBs), of a resource of the PUSCH over the carrier c. $P_{O\_PUSCH,c}(j)$ represents an expected target power value of the PUSCH over the carrier c and is configured by higher-layer signaling. $\alpha_c(j)$ represents a path loss compensation factor of the carrier c as a cell-specific parameter configured by higher-layer signaling. $PL_c$ represents a path loss of the carrier c measured by the UE and can be measured by the UE, as configured by higher-layer signaling, over a pair of carriers or a primary carrier configured by information in the System Information Block 2. With $K_s=1.25$, $\Delta_{TF,c}(i)=10\log_{10}((2^{BPRE \cdot K_s}-1) \cdot \beta_{offset}^{PUSCH})$ represents a different power offset corresponding to a different Modulation and Coding Scheme (MCS); and with $K_s=0$, $\Delta_{TF,c}(i)=0$ represents disablement of a function to adjust power according to an MCS, wherein $K_s$ represents a UE-specific parameter indicated by higher-layer signaling. The Bits Per Resource Element (BPRE) represents the number of bits corresponding to each resource element on the PUSCH, and $\beta_{offset}^{PUSCH}$ represents an offset of an encoding rate of uplink control information carried on the PUSCH relative to an encoding rate of uplink data on the PUSCH and is preconfigured by higher-layer signaling. $f_c(i)$ represents a PUSCH power control adjustment amount for which there are two patterns, i.e., a cumulative value and a current absolute value.

In the LTE-A Rel-10, transmit power $P_{SRS}$ at which the UE transmits an SRS over a carrier c is defined in the equation of:

$$P_{SRS,c}(i)=\min\{P_{CMAX,c}(i), P_{SRS\_OFFSET,c}(m)+10\log_{10}(M_{SRS,c})+P_{O\_PUSCH,c}(j)+\alpha_c(j)\cdot PL_c+f_c(i)\}[dBm],$$

Wherein $P_{SRS\_OFFSET,c}(m)$ represents a power offset of the SRS, relative to a PUSCH, in a different antenna port configuration over the carrier c, m=0 corresponds to a periodic SRS, and m=1 corresponds to an aperiodic SRS. $M_{SRS,c}$ represents a transmit bandwidth, in RBs, of the SRS over the carrier c. The other parameters are the same as the power control parameters of the PUSCH over the carrier.

In the LTE-A Rel-10, transmit power at which a UE transmits a PRACH over a carrier c is defined in the equation of:

$$PPRACH=\min\{P_{CMAX,c}(i), PREAMBLE\_RECEIVED\_TARGET\_POWER+PL_c\}\_[dBm],$$

Wherein PREAMBLE_RECEIVED_TARGET_POWER is calculated by a Media Access Control (MAC) layer of the UE as target power of the PRACH.

In the LTE-A Rel-10, an uplink power control scheme is based upon power control on concurrent transmission, in the same sub-frame, of a PDCCH and a PUSCH over the same or different carriers. If the total transmit power of a UE in the current sub-frame i exceeds the maximum transmit power allowed by the UE, then power shall be scaled down by the UE ensuring transmit power of the PUCCH preferentially while scaling down transmit power of the PUSCH over each carrier c with an equal proportion so as to satisfy the limited maximum transmit power allowed by the UE:

$$\sum_c w(i)\cdot \hat{P}_{PUSCH,c}(i) \leq (\hat{P}_{CMAX}(i)-\hat{P}_{PUCCH}(i)),$$

Wherein $\hat{P}_{PUSCH,c}(i)$ represents a linearity-domain value of $P_{PUSCH,c}(i)$, and $w(i)$ represents a power scaling down factor over each carrier with $0\leq w(i)\leq 1$. If no PUCCH is transmitted in the current sub-frame i, then $\hat{P}_{PUCCH}(i)=0$.

If a UE transmits a PUSCH with Uplink Control Information (UCI) and a PUSCH without UCI concurrently in the current sub-frame i, and the total transmit power of the UE exceeds the maximum transmit power allowed by the UE, then the UE shall ensure firstly the transmit power of the PUCCH not to be scaled down and secondly the transmit power of the PUCCH with the UCI not to be scaled down while scaling down transmit power of the PUSCH over each carrier with an equal proportion so as to satisfy the limited maximum transmit power allowed by the UE:

$$\hat{P}_{PUSCH,j}(i)=\min(\hat{P}_{PUSCH,j}(i), (\hat{P}_{CMAX}(i)-\hat{P}_{PUCCH}(i)))$$

and $$\sum_{c\neq j} w(i)\cdot \hat{P}_{PUSCH,c}(i) \leq (\hat{P}_{CMAX}(i)-\hat{P}_{PUCCH}(i)-\hat{P}_{PUSCH,j}(i)),$$

When the power of all the PUSCHs without UCI is scaled down to zero, and the total transmit power of the UE still exceeds the maximum transmit power allowed by the UE, then the power of the PUSCH with the UCI is further scaled down. If no PUCCH is transmitted in the current sub-frame i, then $\hat{P}_{PUCCH}(i)=0$.

For SRSs transmitted concurrently over multiple carriers in the same sub-frame, if the total transmit power of a UE exceeds the maximum transmit power allowed by the UE, then power of the SRS over each carrier is scaled down with an equal proportion so as to satisfy the limited maximum transmit power allowed by the UE:

$$\sum_c w(i)\cdot \hat{P}_{SRS,c}(i) \leq \hat{P}_{CMAX}(i),$$

Wherein $\hat{P}_{SRS,c}(i)$ represents a linearity-domain value of $P_{SRS,c}(i)$, and $w(i)$ represents an SRS power scaling down factor over each carrier with $0\leq w(i)\leq 1$.

Only intra-band Carrier Aggregation (CA) is supported in uplink transmission defined in the LTE-A Rel-10, and there are assumed similar radio signal propagation characteristics of respective carriers, so all the uplink transmission time are adjusted based upon a Time Advance (TA) obtained in a PRACH procedure over a Primary Component Carrier so that the uplink transmission time of the carriers are aligned and thus power control can be performed in sub-frames.

In the LTE-A Rel-11, uplink CA in different bands (inter-band CA) as well as a mixed deployment CA scheme of a macro base station (denoted by a macro eNB) and a Remote Radio Head (RRH) can be supported. Due to different radio signal propagation characteristics in the different bands and different propagation paths traversed by the macro eNB and the RRH, signals transmitted over different carriers may arrive at the eNB at different time. Thus in the Rel-11, there may be different TAs of different carriers, and uplink transmission time of the carriers may not be aligned, so an uplink channel over a carrier may be transmitted, in different transmission time segments in a sub-frame, concurrently with an uplink channel in a preceding adjacent sub-frame and/or a succeeding adjacent sub-frame. Consequently the power control scheme in sub-frames will not be applicable.

SUMMARY

Embodiments of the invention provide a method and apparatus for controlling uplink power so as to perform power control on uplink channels with different uplink transmission time to thereby ensure the total transmit power of a user equipment at any time in a sub-frame not to exceed the maximum transmit power so that a system can operate normally.

A method of controlling uplink power includes:

a user equipment determining target transmit power of each of uplink channels/signals transmitted in a current uplink sub-frame;

the user equipment dividing transmission time of the uplink channels/signals in the current uplink sub-frame into multiple transmission time segments, wherein uplink channels/signals included in any one of the transmission time segments are the same at any time, and uplink channels/signals included in any one of the transmission time segments are different from uplink channels/signals included in any other one of the transmission time segments; and the user equipment performing power control, in each of the transmission time segments, on the target transmit power of the uplink channels/signals transmitted in the transmission time segment to satisfy that the sum of transmit power, obtained after the power control, of the uplink channels/signals transmitted in the transmission time segment does not exceed preset maximum transmit power of the user equipment.

A user equipment includes:

a target power calculation module configured for the user equipment to determine target transmit power of each of uplink channels/signals transmitted in a current uplink sub-frame;

a time segment division module to divide transmission time of the uplink channels/signals in the current uplink sub-frame into multiple transmission time segments, wherein uplink channels/signals included in any one of the transmission time segments are the same at any time, and uplink channels/signals included in any one of the transmission time segments are different from uplink channels/signals included in any other one of the transmission time segments; and a power control module to perform power control, in each of the transmission time segments, on the target transmit power of the uplink channels/signals transmitted in the transmission time segment to satisfy that the sum of transmit power, obtained after the power control, of the uplink channels/signals transmitted in the transmission time segment does not exceed preset maximum transmit power of the user equipment.

Due to different timing advance corresponding to respective uplink channels/signals in an uplink sub-frame, in the embodiments of the invention, transmission time of uplink channels/signals in an uplink sub-frame are divided into multiple transmission time segments, and power control is performed, in each of the transmission time segments, on the respective uplink channels/signals in the uplink sub-frame to satisfy that the sum of transmit power, obtained after the power control, of the uplink channels/signals transmitted by a user equipment in a current uplink sub-frame in each of the transmission time segments does not exceed preset maximum transmit power and thus a system can operate normally.

DETAILED DESCRIPTION

Due to different timing advance corresponding to respective uplink channels/signals in an uplink sub-frame, in embodiments of the invention, transmission time of uplink channels/signals in an uplink sub-frame are divided into multiple transmission time segments, and power control is performed, in each of the transmission time segments, on the respective uplink channels/signals in the uplink sub-frame to satisfy that the sum of transmit power, obtained after the power control, of the uplink channels/signals transmitted by a user equipment in a current uplink sub-frame in each of the transmission time segments does not exceed preset maximum transmit power and thus a system can operate normally.

Preferably uplink transmission time of carriers belong to the same TA group are the same, that is, transmission time of uplink channels over respective carriers in the TA group are aligned in the same uplink sub-frame.

Figure 1:
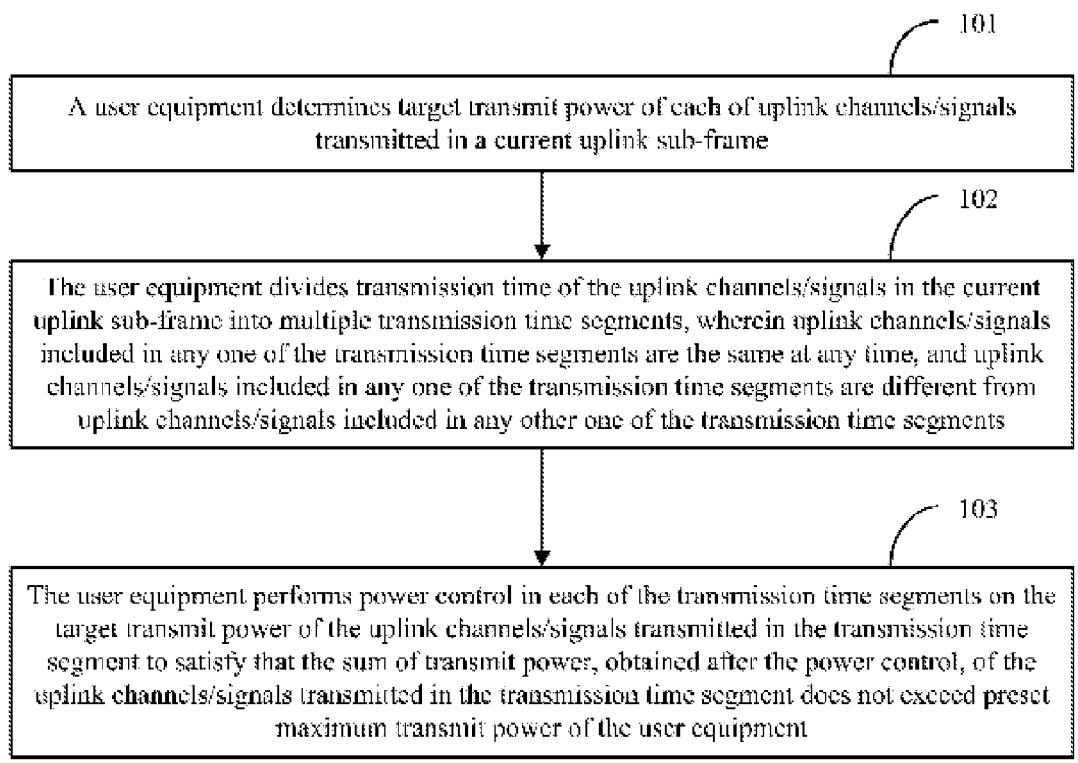
FIG. 1 is a general flow chart of a method of controlling uplink power according to an embodiment of the invention.

Referring to FIG. 1, a general flow of a method of controlling uplink power in an embodiment is as follows.

Step 101, a user equipment determines target transmit power of each of uplink channels/signals (i.e., an uplink channel or an uplink signal or an uplink channel and an uplink signal) transmitted in a current uplink sub-frame.

Step 102, the user equipment divides transmission time of the uplink channels/signals in the current uplink sub-frame into multiple transmission time segments, wherein the uplink channels/signals included in any one of the transmission time segments are the same at any time, and uplink channels/signals included in any one of the transmission time segments are different from uplink channels/signals included in any other one of the transmission time segments.

In an embodiment, uplink channels/signals transmitted in different sub-frames are different uplink channels/signals, and uplink channels/signals transmitted over different carriers are different uplink channels/signals. For example, if PUCCHs is transmitted over a carrier in a sub-frame i and a sub-frame i+1, then the PUCCH in the sub-frame i and the PUCCH in the sub-frame i+1 are different PUCCHs. In another example, PUSCHs are transmitted over both carriers 1 and 2 in a sub-frame i, then the PUSCH over the carrier 1 and the PUSCH over the carrier 2 are different PUSCHs.

Step 103, the user equipment performs power control, in each of the transmission time segments, on the target transmit power of the uplink channels/signals transmitted in the transmission time segment to satisfy that the sum of transmit power, obtained after the power control, of the uplink channels/signals transmitted in the transmission time segment does not exceed preset maximum transmit power of the user equipment.

The user equipment can transmit the uplink channels/signals with the transmit power obtained after the power control.

In a preferred implementation of the step 102, the user equipment divides the transmission time of the uplink channels/signals in the current uplink sub-frame into the multiple transmission time segments according to timing advance corresponding to the respective uplink channels/signals, wherein the number of transmission time segments is the number of uplink carriers, aggregated by the user equipment or activated, with different timing advance plus one. Particularly the transmission time are divided into the transmission time segments according to transmit start time and/or end time of the respective uplink channels/signals.

The user equipment performs power control by determining in each of the transmission time segments whether the sum of the target transmit power of the uplink channels/signals in the current uplink sub-frame in the transmission time segment and the transmit power of the other uplink channels/signals transmitted in the time segment exceeds the preset maximum transmit power.

When exceeding is determined, the user equipment performs power control on the target transmit power of the uplink channels/signals transmitted in the transmission time segment to satisfy that the sum of the transmit power of the uplink channels/signals in the current uplink sub-frame obtained after the power control and the transmit power of the other uplink channels/signals in the transmission time segment does not exceed the preset maximum transmit power.

When no exceeding is determined, the user equipment determines the target transmit power of the uplink channel/signals in the current uplink sub-frame as the transmit power of the uplink channels/signals in the time segment.

When exceeding is determined, the user equipment performs power control on the target transmit power of the uplink channels/signals transmitted in the transmission time segment particularly as follows:

The user equipment performs power control on the target transmit power of the uplink channels/signals in the current uplink sub-frame transmitted in the transmission time segment based upon the transmit power of the other uplink channels/signals transmitted in the transmission time segment to satisfy that the sum of the transmit power, obtained after the power control, of the uplink channels/signals in the current uplink sub-frame in the transmission time segment does not exceed currently available maximum transmit power, wherein the currently available maximum transmit power is the preset maximum transmit power minus the transmit power of the other uplink channels/signals; or The user equipment performs power control on the target transmit power of the other uplink channels/signals transmitted in the transmission time segment and the target transmit power of the uplink channels/signals in the current uplink sub-frame transmitted in the transmission time segment to satisfy that the sum of the transmit power, obtained after the power control, of the uplink channels/signals in the current uplink sub-frame and the transmit power, obtained after the power control, of the other uplink channels/signals, in the transmission time segment does not exceed the preset maximum transmit power; or The user equipment performs power control on the target transmit power of the uplink channels/signals in the current uplink sub-frame transmitted in the transmission time segment to satisfy that the sum of the transmit power, obtained after the power control, of the uplink channels/signals in the current uplink sub-frame in the transmission time segment does not exceed the preset maximum transmit power.

Particularly in different transmission time segments, the other uplink channels/signals may include: uplink channels/signals in a preceding adjacent uplink sub-frame to the current uplink sub-frame transmitted in a transmission time segment and/or uplink channels/signals in a succeeding adjacent uplink sub-frame to the current uplink sub-frame transmitted in a transmission time segment; or the other uplink channels/signals are a null set, that is, there are no other uplink channels/signals in the transmission time segment.

The method of controlling power described above can be differently applied particularly in the following three scenarios for the different scenarios of the other uplink channels/signals in different transmission time segments:

In a first scenario, when the other uplink channels/signals included in a transmission time segment are uplink channels/signals in a preceding adjacent uplink sub-frame to the current uplink sub-frame transmitted in the transmission time segment, if it is determined that the sum of the target transmit power of the uplink channels/signals in the current uplink sub-frame in the transmission time segment and the transmit power of the other uplink channels/signals transmitted in the transmission time segment exceeds the preset maximum transmit power, then the user equipment performs power control on the target transmit power of the uplink channels/signals transmitted in the transmission time segment particularly as follows: the user equipment performs power control on the target transmit power of the uplink channels/signals in the current uplink sub-frame based upon the transmit power of the other uplink channels/signals transmitted in the transmission time segment to satisfy that the sum of the transmit power, obtained after the power control, of the uplink channels/signals in the current uplink sub-frame does not exceed currently available maximum transmit power, wherein the currently available maximum transmit power is the preset maximum transmit power minus the transmit power of the other uplink channels/signals; or the user equipment performs power control on the target transmit power of the other uplink channels/signals transmitted in the transmission time segment and the target transmit power of the uplink channels/signals transmitted concurrently in the current uplink sub-frame to satisfy that the sum of the transmit power, obtained after the power control, of the uplink channels/signals in the current uplink sub-frame and the transmit power, obtained after the power control, of the other uplink channels/signals does not exceed the preset maximum transmit power.

In a second scenario, when the other uplink channels/signals included in a transmission time segment are uplink channels/signals transmitted in a succeeding adjacent uplink sub-frame to the current uplink sub-frame transmitted in the transmission time segment, if it is determined that the sum of the target transmit power of the uplink channels/signals in the current uplink sub-frame in the transmission time segment and the transmit power of the other uplink channels/signals transmitted in the transmission time segment exceeds the preset maximum transmit power, then the user equipment performs power control on the target transmit power of the uplink channels/signals transmitted in the transmission time segment particularly as follows: the user equipment performs power control on the target transmit power of the other uplink channels/signals transmitted in the transmission time segment and the target transmit power of the uplink channels/signals in the current uplink sub-frame to satisfy that the sum of the transmit power, obtained after the power control, of the uplink channels/signals transmitted concurrently in the current uplink sub-frame and the transmit power, obtained after the power control, of the other uplink channels/signals does not exceed the preset maximum transmit power.

In a third scenario, when the other uplink channels/signals included in a transmission time segment are a null set, that is, neither uplink channels/signals transmitted in a preceding adjacent uplink sub-frame to the current uplink sub-frame nor uplink channels/signals transmitted in a succeeding adjacent uplink sub-frame to the current uplink sub-frame are included in the transmission time segment, if it is determined that the sum of the target transmit power of the uplink channels/signals in the current uplink sub-frame in the transmission time segment and the transmit power of the other uplink channels/signals transmitted in the transmission time segment exceeds the preset maximum transmit power, then the user equipment performs power control on the target transmit power of the uplink channels/signals transmitted in the transmission time segment particularly as follows: the user equipment performs power control on the target transmit power of the uplink channels/signals in the current uplink sub-frame transmitted in the transmission time segment to satisfy that the sum of the transmit power, obtained after the power control, of the uplink channels/signals in the current uplink sub-frame does not exceed the preset maximum transmit power.

The user equipment performs power control, in each of the transmission time segments, on the target transmit power of the uplink channels/signals, for which power control is required, transmitted in the transmission time segment particularly as follows:

In a first scheme, the user equipment scales down the target transmit power of the uplink channels/signals, for which power control is required, transmitted in the transmission time segment with an equal proportion to determine the transmit power of the uplink channels/signals in the transmission time segment obtained after the power control.

In a second scheme, the user equipment scales down the power of the uplink channels/signals, for which power control is required, transmitted in the transmission time segment sequentially in an order of ascending channel/signal priorities and scales down the target transmit power of multiple uplink channels/signals with the same channel/signal priority with an equal proportion to determine the transmit power of the uplink channels/signals in the transmission time segment obtained after the power control, wherein target transmit power of uplink channels/signals without power scaling down are determined as transmit power of the uplink channels/signals in the transmission time segment obtained after the power control.

In a third scheme, the user equipment scales down the target transmit power of the uplink channels/signals in the same frequency band among the uplink channels/signals, for which power control is required, transmitted in the transmission time segment with an equal proportion and scales down the target transmit power of the uplink channels/signals in different frequency bands among the uplink channels/signals, for which power control is required, transmitted in the transmission time segment with power scaling down factors corresponding to their frequency bands to determine the transmit power of the respective uplink channels/signals in the transmission time segment obtained after the power control.

In a fourth scheme, the user equipment scales down, sequentially in an order of ascending channel/signal priorities, the target transmit power of the uplink channels/signals, in the same frequency band, with the same channel/signal priority among the uplink channels/signals, for which power control is required, transmitted in the transmission time segment with an equal proportion, and the target transmit power of the uplink channels/signals, in different frequency bands, with the same channel/signal priority among the uplink channels/signals, for which power control is required, transmitted in the transmission time segment with power scaling down factors corresponding to their frequency bands, to determine the transmit power of the respective uplink channels/signals in the transmission time segment obtained after the power control, wherein the target transmit power of the uplink channels/signals with the power scaling down factor of 1 are determined as the transmit power of the uplink channels/signals in the transmission time segment obtained after the power control, and the target transmit power of the uplink channels/signals without power scaling down are determined as the transmit power of the uplink channels/signals in the transmission time segment obtained after the power control.

Particularly, following the description of the three particular scenarios above, the uplink channels/signals for which power scaling down is required are the uplink channels/signals in the current uplink sub-frame transmitted in the transmission time segment or the uplink channels/signals in the current uplink sub-frame transmitted in the transmission time segment and the other uplink channels/signals transmitted in the transmission time segment.

Preferably the channel/signal priorities are:

A PUCCH>a PUSCH with UCI>a PUSCH without UCI>an SRS; or

A PUCCH>a PUSCH with UCI>a PUSCH without UCI=an SRS; or

If there is a PRACH, then:

A PRACH>a PUCCH>a PUSCH with UCI>a PUSCH without UCI>an SRS; or

A PRACH>a PUCCH>a PUSCH with UCI>a PUSCH without UCI=an SRS; or

A PUCCH>a PRACH>a PUSCH with UCI>a PUSCH without UCI>an SRS; or

A PUCCH>a PRACH>a PUSCH with UCI>a PUSCH without UCI=an SRS.

Particularly the SRS includes an aperiodic SRS and a periodic SRS, wherein the priority of the aperiodic SRS is above or equal to that of the periodic SRS.

Power control is performed according to the priorities particularly by scaling down the power of the uplink channels/signals with the lowest priority with an equal proportion (in correspondence to the second scheme) or with the power scaling down factors corresponding to their frequency bands (in correspondence to the fourth scheme), and if the power is scaled down to zero and the total power of the uplink channels/signals of the user equipment in the transmission time segment is still above the maximum transmit power, then by scaling down the power of the uplink channels/signals with the second lowest priority with an equal proportion (in correspondence to the second scheme) or with the power scaling down factors corresponding to their frequency bands (in correspondence to the fourth scheme) and so on until the total power of the uplink channels/signals of the user equipment in the transmission time segment is not above the maximum transmit power. If the total power of the uplink channels/signals of the user equipment is not above the maximum transmit power simply after the power of the uplink channels/signals with one or more lower priorities is scaled down, then the transmit power of the uplink channels/signals with the other priorities remains unchanged, that is, their target transmit power is the transmit power obtained after the power control.

In order to avoid the user equipment from frequently changing the transmit power, before the user equipment transmits the uplink channels/signals with the transmit power obtained after the power control, the method further includes the following steps: the user equipment determines the lowest value among the transmit power, obtained after the power control, of the uplink channels/signals in the current uplink sub-frame in the respective transmission time segments as the transmit power of the uplink channels/signals in the respective transmission time segments in the current uplink sub-frame and transmits the respective uplink channels/signals in the current uplink sub-frame with the transmit power; or In order to enable the user equipment to use the transmit power reasonably, before the user equipment transmits the uplink channels/signals with the transmit power obtained after the power control, the method further includes the following steps: the user equipment transmits the uplink channels/signals in the current uplink sub-frame respectively with the transmit power of the respective uplink channels/signals in the current uplink sub-frame in each of the transmission time segments obtained after the power control. Preferably this method is applicable to uplink channels/signals modulated by Binary Phase Shift Keying (BPSK) or Quadrature Phase Shift Keying (QPSK).

Preferably the preset maximum transmit power in an embodiment includes the maximum transmit power allowed by the user equipment and/or the maximum transmit power allowed in each of the frequency bands.

The uplink channels/signals in the embodiment include but will not be limited to PUCCHs, PUSCHs, PRACHs, SRSs, etc. wherein the uplink channels include but will not be limited to PUCCHs, PUSCHs, PRACHs, etc., and the uplink signals include but will not be limited to SRSs, etc.

Preferably for PRACHs transmitted consecutively in multiple uplink sub-frames, transmit power at which they are transmitted in the subsequent sub-frames can be determined based upon transmit power in which they are transmitted in the first sub-frame, and power control on the uplink channels/signals in the subsequent sub-frames can be performed based upon the transmit power of the PRACHs (that is, the transmit power of the PRACHs remains unchanged, for example, the transmit power of the PRACHs can be incorporated into the preset maximum transmit power, and the difference between the preset maximum transmit power and the transmit power of the PRACHs can be determined as the currently used preset maximum transmit power); and Preferably a base station can transmit PUCCHs preferentially over a Primary Component Carrier (PCC) so as to ensure transmit power of the PUCCHs as much as possible; or the base station can determine an uplink carrier with the highest TA as the PCC.

Preferably the power scaling down factors can be prescribed by the user equipment with the base station or notified by the base station to the user equipment via higher-layer signal or Physical Downlink Control Channel (PDCCH) signaling, the higher-layer signal includes Radio Resource Control (RRC) signaling and Medium Access Control (MAC) signaling. The power scaling down factors can be configured based upon different characteristics of the frequency band, e.g., frequency locations, bandwidths, channel states, configured types of transmission information, services, etc. Preferably the power scaling down factors of the different frequency bands may be the same or different; and when the power scaling down factors of the different frequency bands are the same, they can be configured fixedly without any prescription or notification.

Preferably the foregoing method can be applicable in both intra-band and inter-band Carrier Aggregation (CA) scenarios.

Preferably the foregoing method can be applicable in both FDD and TDD mode.

An implementation process will be described below in details by way of a typical embodiment.

Figure 2:
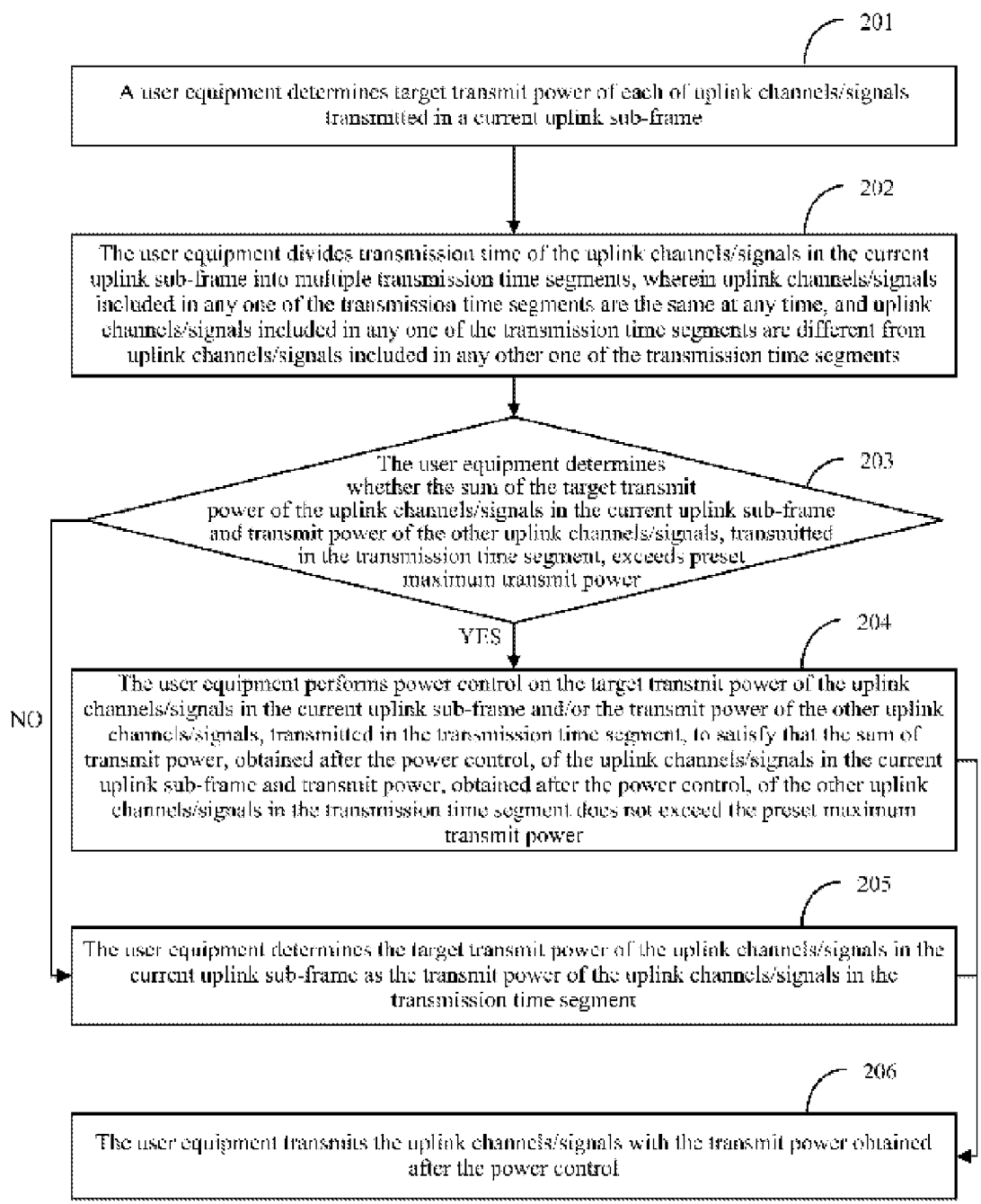
FIG. 2 is a detailed flowchart of the method of controlling uplink power according to the embodiment of the invention.

Referring to FIG. 2, a detailed flow of the method of controlling uplink power according to an embodiment is as follows:

Step 201, a user equipment determines target transmit power of each of uplink channels/signals transmitted in a current uplink sub-frame.

Step 202: The user equipment divides transmission time of the uplink channels/signals in the current uplink sub-frame into multiple transmission time segments.

Step 203: The user equipment determines for each of the transmission time segments in a chronological order whether the sum of the target transmit power of the uplink channels/signals in the current uplink sub-frame and transmit power of the other uplink channels/signals transmitted in the transmission time segment exceeds preset maximum transmit power, and if so, then the flow proceeds to the step 204; otherwise, the flow proceeds to the step 205.

Step 204: The user equipment performs power control on the target transmit power of the uplink channels/signals in the current uplink sub-frame and/or the transmit power of the other uplink channels/signals transmitted in the transmission time segment to satisfy that the sum of transmit power, obtained after the power control, of the uplink channels/signals in the current uplink sub-frame and transmit power, obtained after the power control, of the other uplink channels/signals in the transmission time segment does not exceed the preset maximum transmit power.

Step 205: The user equipment determines the target transmit power of the uplink channels/signals in the current uplink sub-frame as the transmit power of the uplink channels/signals in the transmission time segment.

Step 206: The user equipment transmits the uplink channels/signals with the transmit power obtained after the power control.

Figure 3:
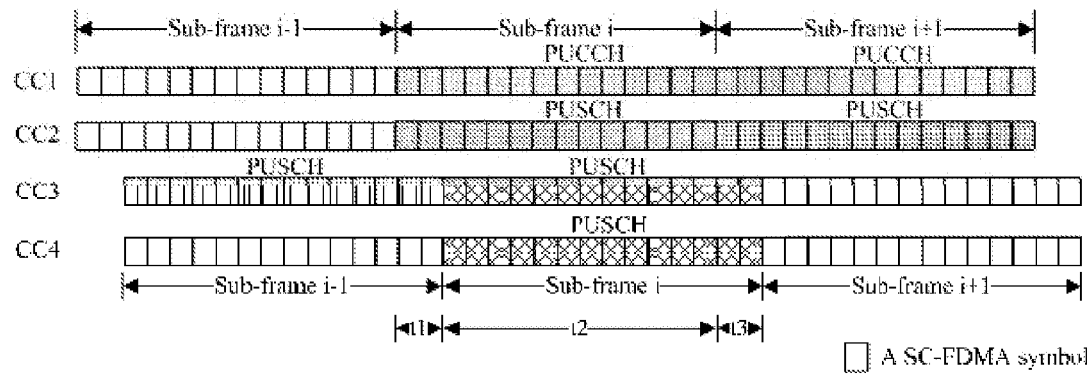
FIG. 3 is a schematic diagram of transmission according to an embodiment of the invention.

Referring to FIG. 3, for example, a User Equipment (UE) (or referred to as a terminal device) aggregates four carriers for uplink transmission, and due to different TAs, uplink transmission time of the carriers 1 and 2 are earlier than those of the carriers 3 and 4 by two Single Carrier-Frequency Division Multiple Access (SC-FDMA) symbols, FIG. 3 illustrates a transmission scenario, and the UE determines transmit power of channels in a sub-frame i (i.e., a current sub-frame) particularly as follows:

Firstly the UE calculates target transmit power $P_{PUCCH,1}(i)$ of a PUCCH over the carrier 1 and target transmit power $P_{PUSCH,2}(i)$, $P_{PUSCH,3}(i)$ and $P_{PUSCH,4}(i)$ of PUSCHs over the carriers 2, 3 and 4 respectively in the relevant equations as introduced in Background of the Invention; and determines a linearity-domain value of $\hat{P}_X = 10^{P_X/10}$, wherein X represents a kind of channel/signal.

Due to different uplink transmission time for the different carriers, there is concurrent transmission of different uplink channels in three transmission time segments in the current uplink sub-frame, wherein the PUCCH over the carrier 1 and the PUSCH over the carrier 2 are transmitted concurrently with the PUSCH over the carrier 3 in a preceding adjacent sub-frame in the first transmission time segment t1, the PUCCH over the carrier 1 and the PUSCHs over the carriers 2, 3 and 4 are transmitted concurrently in the second transmission time segment t2, and the PUSCHs over the carriers 3 and 4 are transmitted concurrently with the PUCCH over the carrier 1 and the PUSCH over the carrier 2 in a succeeding adjacent sub-frame in the third transmission time segment 3, and then the UE performs power control respectively in these three transmission time segments, power control needs to be performed in each of the transmission time segments by taking into account the transmit power of the uplink channels/signals transmitted in the preceding adjacent uplink sub-frame to the current uplink sub-frame and/or the transmit power of the uplink channels/signals transmitted in the succeeding adjacent uplink sub-frame to the current uplink sub-frame in the transmission time segment, particularly as follows:

In the time segment t1, since the PUSCH is transmitted over the carrier 3 in the preceding adjacent uplink sub-frame (the sub-frame i−1) with a determined transmit power $P_{PUSCH,3}(i-1)$ and no uplink channel/signal is transmitted over the carrier 4 in the preceding adjacent uplink subframe, the UE needs to perform power control in the time segment by taking into account the transmit power of the PUSCH over the carrier 3 in the sub-frame i–1, and the UE determines whether the sum of the target transmit power of the uplink channels/signals in the current sub-frame transmitted in the transmission time segment and the transmit power of the uplink channels/signals transmitted concurrently in the preceding adjacent sub-frame to the current sub-frame exceeds maximum transmit power $P_{CMAX}$ allowed by the UE.

When it is determined that $\hat{P}_{PUCCH,1}(i)+\hat{P}_{PUSCH,2}(i)+\hat{P}_{PUSCH,3}(i-1) \leq \hat{P}_{CMAX}(i)$, no power will be scaled down in the transmission time segment, and the target transmit power of the respective uplink channels/signals are determined as the transmit power obtained after the power control, i.e., $P_{PUCCH,1,t1}(i)=P_{PUCCH,1}(i)$ and $P_{PUSCH,2,t1}(i)=P_{PUSCH,2}(i)$.

When it is determined that $\hat{P}_{PUCCH,1}(i)+\hat{P}_{PUSCH,2}(i)+\hat{P}_{PUSCH,3}(i-1)>\hat{P}_{CMAX}(i)$, power control will be performed on the PUCCH over the carrier 1 and the PUSCH over the carrier 2 in the transmission time segment to satisfy that the sum of the transmit power, obtained after the power control, of the uplink channels/signals in the transmission time segment in the current sub-frame does not exceeds currently available maximum transmit power, wherein the currently available maximum transmit power is the maximum transmit power allowed by the UE minus the transmit power of the other uplink channels/signals in the preceding adjacent sub-frame to the current sub-frame, particularly as follows:

In a first scheme, the target transmit power of the uplink channels/signals transmitted concurrently in the current sub-frame in the transmission time segment is scaled down with an equal proportion in the equation of (1), wherein c represents the serial number of a carrier, i represents the serial number of a sub-frame, and $$\sum_c \hat{P}_c(i-1)$$

represents the sum of the transmit power of the uplink channels/signals in the preceding adjacent sub-frame to the current sub-frame; and particularly in the transmission time segment, neither SRSs nor PRACHs will be transmitted, and only the PUSCH is transmitted over the carrier 3 in the preceding adjacent sub-frame, and then equation of (1) is equivalent to $w(i) \cdot (\hat{P}_{PUCCH,1}(i)+\hat{P}_{PUSCH,2}(i)) \leq (\hat{P}_{CMAX}(i) - \hat{P}_{PUSCH,3}(i-1))$, that is, a value of w(i) (a factor) satisfying the equation is found, and the transmit power, obtained after the power control, of the PUCCH and the PUSCH over the carrier 1 and the carrier 2 in the current sub-frame in the current transmission time segment is determined as $P_{PUCCH,1,t1}(i)=w(i) \cdot \hat{P}_{PUCCH,1}(i)$ and $P_{PUSCH,2,t1}(i)=w(i) \cdot \hat{P}_{PUSCH,2}(i)$ respectively;

$$w(i) \cdot \left( \sum_c \hat{P}_{PUCCH,c}(i) + \sum_c \hat{P}_{PUSCH,c}(i) + \sum_c \hat{P}_{SRS,c}(i) + \sum_c \hat{P}_{PRACH,c}(i) \right) \leq \left( \hat{P}_{CMAX}(i) - \sum_c \hat{P}_c(i-1) \right) \quad (1)$$

In a second scheme, the target transmit power of the channels/signals with the lowest priority transmitted concurrently in the current sub-frame in the transmission time segment is scaled down with an equal proportion according to the channel/signal priorities. Firstly the target transmit power of the channels/signals with the lowest priority is scaled down with an equal proportion, and taking the lowest priority of SRSs as an example, the target transmit power of the SRSs (if any) is scaled down with an equal proportion in the equation of (2), and if there is w(i) of other than zero, then power scaling down will be terminated, and the target transmit power of the channels/signals with the other priorities (e.g., PUCCHs, PRACHs and PUSCHs) are unchanged and determined as the transmit power of the uplink channels/signals in the transmission time segment obtained after the power control; and if there is no w(i) of other than zero (that is, the sum of the target transmit power of the remaining channels/signals still exceeds the maximum transmit power allowed by the UE when the target transmit power of the SRSs is scaled down to zero), then further the target transmit power of the channels/signals with the second lowest priority needs to be scaled down with an equal proportion, and taking the second lowest priority of PUSCHs without UCI as an example, the target transmit power of the PUSCHs without UCI is scaled down with an equal proportion in the equation of (3), wherein j represents the serial number of a PUSCH with UCI, and so on until the limited maximum transmit power is satisfied; and particularly in the transmission time segment, neither SRSs nor PRACHs will be transmitted, and then firstly the power of the PUSCHs is scaled down with an equal proportion, and only the PUSCH is transmitted concurrently over the carrier 3 in the preceding adjacent sub-frame; and the equation of (3) is equivalent to $w(i) \cdot \hat{P}_{PUSCH,2}(i) \leq (\hat{P}_{CMAX}(i) - \text{PPUCCH},1(i) - \hat{P}_{PUSCH,3}(i-1))$, and a value of w(i) (a factor) satisfying the equation is found, and the transmit power, obtained after the power control, of the PUCCH and the PUSCH over the carrier 1 and the carrier 2 in the current sub-frame in the current transmission time segment is determined as $P_{PUCCH,1}(i)=\hat{P}_{PUCCH,1}(i)$ and $P_{PUSCH,2}(i)=\hat{P}_{CMAX}(i)-\hat{P}_{PUCCH,1}(i)-\hat{P}_{PUSCH,3}(i-1)$ respectively;

$$\sum_c w(i) \cdot \hat{P}_{SRS,c}(i) \leq \left( \hat{P}_{CMAX}(i) - \sum_c \hat{P}_c(i-1) - \sum_c \hat{P}_{PUCCH,c}(i) - \sum_c \hat{P}_{PUSCH,c}(i) - \sum_c \hat{P}_{PRACH,c}(i) \right); \quad (2)$$

and $$\sum_{c,c \neq j} w(i) \cdot \hat{P}_{PUSCH,c}(i) \leq \left( \hat{P}_{CMAX}(i) - \sum_c \hat{P}_c(i-1) - \sum_c \hat{P}_{PUCCH,c}(i) - \sum_c \hat{P}_{PPACH,c}(i) - \sum_j \hat{P}_{PUSCH,j}(i) \right) \quad (3)$$

It shall be noted that this method can be modified by scaling down the target transmit power of the channels/signals in the current sub-frame and the preceding sub-frame transmitted concurrently in the transmission time segment with an equal proportion (the first scheme above is reused) or based upon the channel/signal priorities (the second scheme above is reused). This method is suitable for the UE transmitting in each of the different transmission time segments with the transmit power in the time segment obtained after the power control, that is, the same uplink channel/signal may be transmitted with different transmit power in different transmission time segments in a sub-frame.

It shall be noted that the transmit power of the PUSCH over the carrier 3 in the preceding uplink sub-frame is taken into account in both of the schemes above, but the transmit power of the PUSCH over the carrier 3 in the preceding uplink sub-frame has been determined by taking into account the PUCCH over the carrier 1 and the PUSCH over the carrier 2 in the current sub-frame transmitted concurrently in a part of the transmission time segments, so the maximum transmit power allowed by the UE in the current sub-frame minus the transmit power of the PUSCH over the carrier 3 in the preceding uplink sub-frame is allocated for the PUCCH over the carrier 1 and the PUSCH over the carrier 2, and this is equivalent to power control concurrently on the target transmit power of the uplink channels/signals in the current uplink sub-frame and the uplink channels/signals in the preceding uplink sub-frame in the transmission time segment as described above in the first or second scheme, the power of the uplink channels/signals transmitted concurrently in the current sub-frame and the preceding sub-frame in the transmission time segment can be ensured to be scaled down with an equal proportion in the first scheme, and the transmit power of the PUCCHs may not be scaled down due to their highest priority in the second scheme.

Actually the time segment t1 in the current sub-frame is the last time segment in the preceding adjacent sub-frame, and in this time segment in the preceding uplink sub-frame, power control has been performed on the target transmit power of the PUSCH over the carrier 3, the PUCCH over the carrier 1 and the PUSCH over the carrier 2 based upon the maximum transmit power of the user equipment, so the user equipment can determine a result of power control in the last time segment in the preceding sub-frame directly as the transmit power of the PUCCH over the carrier 1 and the PUSCH over the carrier 2 in the time segment t1 in the current sub-frame as if the result of power control is stored therein without further performing power control in the steps above.

There are no uplink channels/signals transmitted concurrently in the preceding sub-frame and the succeeding sub-frame in the time segment t2, so the UE determines whether the sum of the target transmit power of the uplink channels/signals in the current sub-frame in the transmission time segment exceeds the maximum transmit power $P_{CMAX}$ allowed by the UE.

When it is determined that $\hat{P}_{PUCCH,1}(i)+\hat{P}_{PUSCH,2}(i)+\hat{P}_{PUSCH,3}(i)+\hat{P}_{PUSCH,4}(i) \leq \hat{P}_{CMAX}(i)$, no power will be scaled down in the transmission time segment, and the target transmit power of the respective channels/signals are determined as the transmit power obtained after the power control, i.e., $\hat{P}_{PUCCH,1,t2}(i)=P_{PUCCH,1}(i)$, $P_{PUSCH,2,t2}(i)=P_{PUSCH,2}(i)$, $P_{PUSCH,3,t2}(i)=P_{PUSCH,3}(i)$ and $P_{PUSCH,4,t2}(i)=P_{PUSCH,4}(i)$.

When it is determined that PUCCH, $\hat{P}_{PUCCH,1}(i)+\hat{P}_{PUSCH,2}(i)+\hat{P}_{PUSCH,3}(i)+\hat{P}_{PUSCH,4}(i) > \hat{P}_{CMAX}(i)$, power control will be performed on the PUCCH over the carrier 1 and the PUSCHs over the carriers 2, 3 and 4 in the transmission time segment to satisfy that the sum of the transmit power, obtained after the power control, of the uplink channels/signals in the transmission time segment in the current sub-frame does not exceeds the maximum transmit power allowed by the UE, particularly as follows:

In a first scheme, the target transmit power of the uplink channels/signals transmitted concurrently in the current sub-frame in the transmission time segment is scaled down with an equal proportion in the equation of (4), wherein c represents the serial number of a carrier, and i represents the serial number of a sub-frame; and particularly in the transmission time segment, neither SRSs nor PRACHs are transmitted, and then equation of (4) is equivalent to $w(i) \cdot (\hat{P}_{PUCCH,1}(i)+\hat{P}_{PUSCH,2}(i)+\hat{P}_{PUSCH,3}(i)+\hat{P}_{PUSCH,4}(i))$ $\leq \hat{P}_{CMAX}(i)$, and a value of w(i) (a factor) satisfying the equation is found, and the transmit power, obtained after the power control, of the PUCCH over the carrier 1 in the current transmission time segment is determined as $P_{PUCCH,1,t2}(i)=w(i) \cdot \hat{P}_{PUCCH,1}(i)$, and the transmit power, obtained after the power control, of the PUSCHs over the carriers 2, 3 and 4 in the current transmission time segment is determined as $P_{PUSCH,2,t2}(i)=w(i) \cdot \hat{P}_{PUSCH,2}(i)$, $P_{PUSCH,3,t2}(i)=w(i) \cdot \hat{P}_{PUSCH,3}(i)$ and $P_{PUSCH,4,t2}(i)=w(i) \cdot \hat{P}_{PUSCH,4}(i)$ respectively;

$$w(i) \cdot \left( \sum_c \hat{P}_{PUCCH,c}(i) + \sum_c \hat{P}_{PUSCH,c}(i) + \sum_c \hat{P}_{SRS,c}(i) + \sum_c \hat{P}_{PRACH,c}(i) \right) \leq (\hat{P}_{CMAX}(i)) \quad (4)$$

In a second scheme, the target transmit power of the channels/signals with the lowest priority transmitted concurrently in the current sub-frame in the transmission time segment is scaled down with an equal proportion according to the channel/signal priorities. Firstly the target transmit power of the channels/signals with the lowest priority is scaled down with an equal proportion, and taking the lowest priority of SRSs as an example, the target transmit power of the SRSs (if any) is scaled down with an equal proportion in the equation of (5), and if there is w(i) of other than zero, then power scaling down will be terminated, and the target transmit power of the channels/signals with the other priorities (e.g., PUCCHs, PRACHs and PUSCHs) are unchanged and determined as the transmit power of the uplink channels/signals in the transmission time segment obtained after the power control; and if there is no w(i) of other than zero (that is, the sum of the target transmit power of the remaining channels/signals still exceeds the maximum transmit power allowed by the UE when the target transmit power of the SRSs is scaled down to zero), then further the target transmit power of the channels/signals with the second lowest priority needs to be scaled down with an equal proportion, and taking the second lowest priority of PUSCHs without UCI as an example, the target transmit power of the PUSCHs without UCI is scaled down with an equal proportion in the equation of (6), wherein j represents the serial number of a PUSCH with UCI, and so on until the limited maximum transmit power is satisfied; and particularly in the transmission time segment, neither SRSs nor PRACHs are transmitted, and then firstly the power of the PUSCHs is scaled down with an equal proportion, and the equation of (6) is equivalent to $w(i) \cdot (\hat{P}_{PUSCH,2}(i)+\hat{P}_{PUSCH,3}(i)+\hat{P}_{PUSCH,4}(i)) \leq (\hat{P}_{CMAX}(i)-\hat{P}_{PUCCH,1}(i))$, and a value of w(i) (a factor) satisfying the equation is found, and the transmit power, obtained after the power control, of the PUCCH over the carrier 1 in the current sub-frame in the current transmission time segment is determined as $P_{PUCCH,1}(i)=P_{PUCCH,1}(i)$ and the transmit power, obtained after the power control, of the PUSCHs over the carriers 2, 3 and 4 in the current transmission time segment is determined as $P_{PUSCH,2,t2}(i)=w(i) \cdot \hat{P}_{PUSCH,2}(i)$, $P_{PUSCH,3,t2}(i)=w(i) \cdot \hat{P}_{PUSCH,3}(i)$ and $P_{PUSCH,4,t2}(i)=w(i) \cdot \hat{P}_{PUSCH,4}(i)$ respectively;

$$\sum_c w(i) \cdot \hat{P}_{SRS,c}(i) \leq \left( \hat{P}_{CMAX}(i) - \sum_c \hat{P}_{PUCCH,c}(i) - \sum_c \hat{P}_{PUSCH,c}(i) - \sum_c \hat{P}_{PRACH,c}(i) \right); \quad (5)$$

and

-continued $$\sum_{c,c\neq j} w(i) \cdot \hat{P}_{PUSCH,c}(i) \leq \qquad (6)$$

$$\left( \hat{P}_{CMAX}(i) - \sum_c \hat{P}_{PUCCH,c}(i) - \sum_c \hat{P}_{PPACH,c}(i) - \sum_j \hat{P}_{PUSCH,j}(i) \right)$$

In the time segment t3, since the PUCCH over the carrier 1 and the PUSCH over the carrier 2 are transmitted in the succeeding adjacent sub-frame (the sub-frame i+1), firstly the UE determines the target transmit power $P_{PUCCH,1}(i+1)$ of the PUCCH over the carrier 1 and the target transmit power $P_{PUSCH,2}(i+1)$ of the PUSCH over the carrier 2 in the succeeding adjacent sub-frame (the sub-frame i+1). The UE needs to perform power control in the transmission time segment by taking into account the target transmit power of the PUCCH over the carrier 1 and the PUSCH over the carrier 2 in the sub-frame i+1, so the UE determines whether the sum of the target transmit power of the uplink channels/signals in the current sub-frame transmitted in the transmission time segment and the transmit power of the uplink channels/signals transmitted concurrently in the succeeding adjacent sub-frame to the current sub-frame exceeds the maximum transmit power $P_{CMAX}$ allowed by the UE.

When it is determined that $\hat{P}_{PUCCH,1}(i+1)+\hat{P}_{PUSCH,1}(i+1)+\hat{P}_{PUSCH,3}(i)+\hat{P}_{PUSCH,4}(i) \leq \hat{P}_{CMAX}(i)$, no power will be scaled down in the transmission time segment, and the target transmit power of the respective uplink channels/signals are determined as the transmit power obtained after the power control, i.e., $P_{PUSCH,3,t3}(i)=P_{PUSCH,3}(i)$, $P_{PUSCH,4,t3}(i)=P_{PUSCH,4}(i)$, $P_{PUCCH,1,t3}(i+1)=P_{PUCCH,1}(i+1)$ and $P_{PUSCH,2,t3}(i+1)=P_{PUSCH,2}(i+1)$.

When it is determined that $\hat{P}_{PUCCH,1}(i+1)+\hat{P}_{PUSCH,2}(i+1)+\hat{P}_{PUSCH,3}(i)+\hat{P}_{PUSCH,4}(i) > \hat{P}_{CMAX}(i)$, power control will be performed at least on the target transmit power of the PUSCHs over the carriers 3 and 4 in the transmission time segment to satisfy that the sum of the transmit power, obtained after the power control, of the uplink channels/signals in the transmission time segment in the current sub-frame and the transmit power, obtained after the power control, of the uplink channels/signals transmitted concurrently in the succeeding adjacent sub-frame does not exceed the maximum transmit power allowed by the UE, particularly as follows:

In a first scheme, the target transmit power of the uplink channels/signals in the current sub-frame and the uplink channels/signals in the succeeding sub-frame transmitted concurrently in the transmission time segment is scaled down with an equal proportion in the equation of (7), wherein c represents the serial number of a carrier, and i represents the serial number of a sub-frame; and particularly in the transmission time segment, neither SRSs nor PRACHs are transmitted, and the PUCCH over the carrier 1 and the PUSCH over the carrier 2 are transmitted concurrently in the succeeding adjacent sub-frame, and then equation of (7) is equivalent to $w(i) \cdot (\hat{P}_{PUCCH,1}(i+1)+\hat{P}_{PUSCH,2}(i+1)+\hat{P}_{PUSCH,3}(i)+\hat{P}_{PUSCH,4}(i)) \leq \hat{P}_{CMAX}(i)$, and a value of w(i) (a factor) satisfying the equation is found, and the transmit power, obtained after the power control, of the PUCCH and the PUSCH over the carriers 1 and 2 in the succeeding sub-frame in the current transmission time segment is determined as $P_{PUCCH,1,t3}(i+1)=w(i)\cdot\hat{P}_{PUCCH,1}(i+1)$ and $P_{PUSCH,2,t3}(i+1)=w(i)\cdot\hat{P}_{PUSCH,2}(i+1)$ and the transmit power, obtained after the power control, of the PUSCHs over the carriers 3 and 4 in the current sub-frame in the current transmission time segment is determined as $P_{PUSCH,3,t3}(i)=w(i)\cdot\hat{P}_{PUSCH,3}(i)$ and $P_{PUSCH,4,t3}(i)=w(i)\cdot\hat{P}_{PUSCH,4}(i)$ respectively;

$$w(i) \cdot \left( \sum_c \hat{P}_{PUCCH,c}(i) + \sum_c \hat{P}_{PUSCH,c}(i) + \sum_c \hat{P}_{SRS,c}(i) + \right. \qquad (7)$$
$$\sum_c \hat{P}_{PRACH,c}(i) + \sum_{k,k\neq c} \hat{P}_{PUSCH,k}(i+1) + \sum_{k,k\neq c} \hat{P}_{PUSCH,k}(i+1) +$$
$$\left. \sum_{k,k\neq c} \hat{P}_{SRS,k}(i+1) + \sum_{k,k\neq c} \hat{P}_{PRACH,k}(i+1) \right) \leq (\hat{P}_{CMAX}(i))$$

In a second scheme, the target transmit power of the channels/signals with the lowest priority in the current sub-frame and the succeeding sub-frame transmitted concurrently in the transmission time segment is scaled down with an equal proportion according to the channel/signal priorities. Firstly the target transmit power of the channels/signals with the lowest priority is scaled down with an equal proportion, and taking the lowest priority of SRSs as an example, the target transmit power of the SRSs (if any) is scaled down with an equal proportion in the equation of (8), and if there is w(i) of other than zero, then power scaling down will be terminated, and the target transmit power of the channels/signals with the other priorities (e.g., PUCCHs, PRACHs and PUSCHs) are unchanged and determined as the transmit power of the uplink channels/signals in the transmission time segment obtained after the power control; and if there is no w(i) of other than zero (that is, the sum of the target transmit power of the remaining channels/signals still exceeds the maximum transmit power allowed by the UE when the target transmit power of the SRSs is scaled down to zero), then further the target transmit power of the channels/signals with the second lowest priority needs to be scaled down with an equal proportion, and taking the second lowest priority of PUSCHs without UCI as an example, the target transmit power of the PUSCHs without UCI is scaled down with an equal proportion in the equation of (9), wherein j1 represents the serial number of a PUSCH with UCI in the current sub-frame, and j2 represents the serial number of a PUSCH with UCI in the succeeding sub-frame, and so on until the limited maximum transmit power is satisfied; and particularly in the transmission time segment, neither SRSs nor PRACHs are transmitted, and then firstly the power of the PUSCHs is scaled down with an equal proportion, and the equation of (9) is equivalent to $w(i) \cdot (\hat{P}_{PUSCH,2}(i+1)+\hat{P}_{PUSCH,3}(i)+\hat{P}_{PUSCH,4}(i)) \leq (\hat{P}_{CMAX}(i) - \hat{P}_{PUCCH,1}(i+1))$, and a value of w(i) (a factor) satisfying the equation is found, and the transmit power, obtained after the power control, of the PUCCH and the PUSCH over the carrier 1 and the carrier 2 in the succeeding sub-frame in the current transmission time segment is determined as $P_{PUCCH,1,t3}(i+1)=P_{PUCCH,1}(i+1)$ and $P_{PUSCH,2,t3}(i+1)=w(i)\cdot\hat{P}_{PUSCH,2}(i+1)$ respectively, and the transmit power, obtained after the power control, of the PUSCHs over the carrier 3 and the carrier 4 in the current sub-frame in the current transmission time segment is determined as $P_{PUSCH,3,t3}(i)=w(i)\cdot\hat{P}_{PUSCH,3}(i)$ and $P_{PUSCH,4,t3}(i)=w(i)\cdot\hat{P}_{PUSCH,4}(i)$ respectively;

$$w(i) \cdot \left( \sum_c \hat{P}_{SRS,c}(i) + \sum_{k,k\neq c} \hat{P}_{SRS,k}(i) \right) \leq \quad (8)$$

$$\left( \hat{P}_{CMAX}(i) - \sum_c \hat{P}_{PUCCH,c}(i) - \sum_c \hat{P}_{PUSCH,c}(i) - \right.$$

$$\sum_c \hat{P}_{PRACH,c}(i) - \sum_{k,k\neq c} \hat{P}_{PUCCH,k}(i+1) -$$

$$\left. \sum_{k,k\neq c} \hat{P}_{PUSCH,k}(i+1) - \sum_{k,k\neq c} \hat{P}_{PRACH,k}(i+1) \right);$$

and $$w(i) \cdot \left( \sum_c \hat{P}_{PUSCH,c}(i) + \sum_{k,k\neq c} \hat{P}_{PUSCH,k}(i) \right) \leq \quad (9)$$

$$\left( \hat{P}_{CMAX}(i) - \sum_c \hat{P}_{PUCCH,c}(i) - \sum_{j1} \hat{P}_{PUSCH,j1}(i) - \sum_c \hat{P}_{PRACH,c}(i) - \right.$$

$$\left. \sum_{k,k\neq c} \hat{P}_{PUCCH,k}(i+1) - \sum_{j2} \hat{P}_{PUSCH,j2}(i+1) - \sum_{k,k\neq c} \hat{P}_{PRACH,k}(i+1) \right)$$

In the three transmission time segments in the current sub-frame, the UE transmits the uplink channels/signals in each of the periods of time respectively with the transmit power in the time segment obtained after the power control, that is, each of the uplink channels may be transmitted with different transmit power in the different transmission time segments; or for each of the uplink channels/signals, the UE transmits the uplink channel in the current uplink sub-frame with the lowest transmit power of the uplink channel in the different transmission time segments obtained after the power control, that is, each of the uplink channels is transmitted at the same transmit power in the different transmission time segments. Preferably the latter transmission scheme is adopted for PUSCHs modulated at a higher order (e.g., modulated by 16QAM and 64QAM).

It shall be noted that the maximum transmit power allowed by the UE in the embodiments above can be replaced by the maximum transmit power allowed in a frequency band without departing from the scope of the invention, that is, for the carriers in the same frequency band, their power can also be scaled down based upon the maximum transmit power allowed in the frequency band as in the foregoing solution so as to ensure that the sum of the transmit power of the respective channels/signals scaled down in power does not exceed the maximum transmit power allowed in the frequency band; and if the UE also operates over carriers in other frequency bands, then power can also be scaled down in each of the frequency bands based upon the maximum transmit power allowed in the frequency band as in the method above.

It shall be noted that $\hat{P}_{PUCCH}=0$ when there are no PUCCHs in the current sub-frame and/or the preceding sub-frame and/or the succeeding sub-frame. $\hat{P}_{PUSCH}=0$ when there are no PUSCHs in the current sub-frame and/or the preceding sub-frame and/or the succeeding sub-frame. $\hat{P}_{SRS}=0$ when there are no SRSs in the current sub-frame and/or the preceding sub-frame and/or the succeeding sub-frame. $\hat{P}_{PRACH}=0$ when there are no PRACHs in the current sub-frame and/or the preceding sub-frame and/or the succeeding sub-frame. The method above will be equally applicable when the PUCCHs, the PUSCHs, the PRACHs, the SRSs or other uplink channels/signals are located differently for transmission, that is, the method above will also be applicable for any combination of the PUCCHs, the PUSCHs, the PRACHs, the SRSs or the other uplink channels/signals for transmission.

Figure 4:
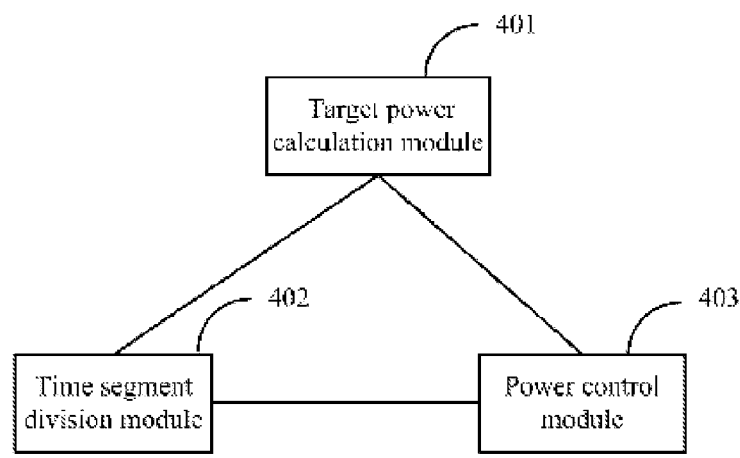
FIG. 4 is a structural diagram of a user equipment according to an embodiment of the invention.

Referring to FIG. 4, a user equipment in this embodiment includes a target power calculation module 401, a time segment division module 402 and a power control module 403.

The target power calculation module 401 is configured for the user equipment to determine target transmit power of each of uplink channels/signals transmitted in a current uplink sub-frame.

The time segment division module 402 is configured to divide transmission time of the uplink channels/signals in the current uplink sub-frame into multiple transmission time segments, wherein the uplink channels/signals included in any one of the transmission time segments are the same at any time, and uplink channels/signals included in any one of the transmission time segments are different from uplink channels/signals included in any other one of the transmission time segments.

The power control module 403 is configured to perform power control, in each of the transmission time segments, on the target transmit power of the uplink channels/signals transmitted in the transmission time segment to satisfy that the sum of transmit power, obtained after the power control, of the uplink channels/signals transmitted in the transmission time segment does not exceed preset maximum transmit power of the user equipment.

The time segment division module 402 is further configured to divide the transmission time of the uplink channels/signals in the current uplink sub-frame into the multiple transmission time segments according to timing advance corresponding to the respective uplink channels/signals, wherein the number of transmission time segments is the number of uplink carriers, aggregated by the user equipment or activated, with different timing advance plus one.

The power control module 403 is further configured:

To determine, in each of the transmission time segments, whether the sum of the target transmit power of the uplink channels/signals in the current uplink sub-frame transmitted in the transmission time segment and the transmit power of the other uplink channels/signals transmitted in the transmission time segment exceeds the preset maximum transmit power.

When exceeding is determined, to perform power control on the target transmit power of the uplink channels/signals transmitted in the transmission time segment to satisfy that the sum of the transmit power, obtained after the power control, of the uplink channels/signals in the current uplink sub-frame and the transmit power, obtained after the power control, of the other uplink channels/signals in the transmission time segment does not exceed the preset maximum transmit power.

When no exceeding is determined, to determine the target transmit power of the uplink channel/signals in the current uplink sub-frame as the transmit power of the uplink channels/signals in the time segment.

When exceeding is determined, the power control module 403 is further configured:

To perform power control on the target transmit power of the uplink channels/signals in the current uplink sub-frame transmitted in the transmission time segment based upon the transmit power of the other uplink channels/signals transmitted in the transmission time segment to satisfy that the sum of the transmit power, obtained after the power control, of the uplink channels/signals in the current uplink subframe in the transmission time segment does not exceed currently available maximum transmit power, wherein the currently available maximum transmit power is the preset maximum transmit power minus the transmit power of the other uplink channels/signals; or To perform power control on the target transmit power of the other uplink channels/signals transmitted in the transmission time segment and the target transmit power of the uplink channels/signals in the current uplink sub-frame transmitted in the transmission time segment to satisfy that the sum of the transmit power, obtained after the power control, of the uplink channels/signals in the current uplink sub-frame and the transmit power, obtained after the power control, of the other uplink channels/signals in the transmission time segment does not exceed the preset maximum transmit power; or To perform power control on the target transmit power of the uplink channels/signals in the current uplink sub-frame transmitted in the transmission time segment to satisfy that the sum of the transmit power, obtained after the power control, of the uplink channels/signals in the current uplink sub-frame in the transmission time segment does not exceed the preset maximum transmit power.

The power control module 403 configured to perform power control, in each of the transmission time segments, on the target transmit power of the uplink channels/signals, for which power control is required, transmitted in the transmission time segment is further configured:

To scale down the target transmit power of the uplink channels/signals, for which power control is required, transmitted in the transmission time segment with an equal proportion to determine the transmit power of the uplink channels/signals in the transmission time segment obtained after the power control; or To scale down the power of the uplink channels/signals, for which power control is required, transmitted in the transmission time segment sequentially in an order of ascending channel/signal priorities and to scale down the target transmit power of multiple uplink channels/signals with the same channel/signal priority with an equal proportion to determine the transmit power of the uplink channels/signals in the transmission time segment obtained after the power control, wherein the target transmit power of the uplink channels/signals without power scaling down are determined as the transmit power of the uplink channels/signals in the transmission time segment obtained after the power control; or To scale down the target transmit power of the uplink channels/signals in the same frequency band among the uplink channels/signals, for which power control is required, transmitted in the transmission time segment with an equal proportion and to scale down the target transmit power of the uplink channels/signals in different frequency bands among the uplink channels/signals, for which power control is required, transmitted in the transmission time segment with power scaling down factors corresponding to their frequency bands to determine the transmit power of the respective uplink channels/signals in the transmission time segment obtained after the power control; or To scale down, sequentially in an order of ascending channel/signal priorities, the target transmit power of the uplink channels/signals, in the same frequency band, with the same channel/signal priority among the uplink channels/signals, for which power control is required, transmitted in the transmission time segment, with an equal proportion and the target transmit power of the uplink channels/signals, in different frequency bands, with the same channel/signal priority among the uplink channels/signals, for which power control is required, transmitted in the transmission time segment with power scaling down factors corresponding to their frequency bands to determine the transmit power of the respective uplink channels/signals in the transmission time segment obtained after the power control, wherein the target transmit power of the uplink channels/signals with the power scaling down factor of 1 are determined as the transmit power of the uplink channels/signals in the transmission time segment obtained after the power control, and the target transmit power of the uplink channels/signals without power scaling down are determined as the transmit power of the uplink channels/signals in the transmission time segment obtained after the power control.

Particularly the uplink channels/signals for which power scaling down is required are the uplink channels/signals in the current uplink sub-frame transmitted in the transmission time segment or the uplink channels/signals in the current uplink sub-frame transmitted in the transmission time segment and the other uplink channels/signals transmitted in the transmission time segment.

Preferably the channel/signal priorities are:

A PUCCH>a PUSCH with UCI>a PUSCH without UCI>an SRS; or

A PUCCH>a PUSCH with UCI>a PUSCH without UCI=an SRS; or

If there is a PRACH, then:

A PRACH>a PUCCH>a PUSCH with UCI>a PUSCH without UCI>an SRS; or

A PRACH>a PUCCH>a PUSCH with UCI>a PUSCH without UCI=an SRS; or

A PUCCH>a PRACH>a PUSCH with UCI>a PUSCH without UCI>an SRS; or

A PUCCH>a PRACH>a PUSCH with UCI>a PUSCH without UCI=an SRS.

Particularly the other uplink channels/signals may include: uplink channels/signals in a preceding adjacent uplink sub-frame to the current uplink sub-frame and/or uplink channels/signals in a succeeding adjacent uplink sub-frame to the current uplink sub-frame transmitted in the transmission time segment; or the other uplink channels/signals are a null set.

The power control module 403 configured to perform power control in each of the transmission time segments on the target transmit power of the uplink channels/signals transmitted in the transmission time segment is further configured:

To determine the lowest value among the transmit power, obtained after the power control, of the uplink channels/signals in the current uplink sub-frame in the respective transmission time segments as the transmit power of the uplink channels/signals in the respective transmission time segments in the current uplink sub-frame and to transmit the respective uplink channels/signals in the current uplink sub-frame with the transmit power; or To transmit the uplink channels/signals in the current uplink sub-frame respectively with the transmit power of the respective uplink channels/signals in the current uplink sub-frame in each of the transmission time segments obtained after the power control.

When the power control module transmits the uplink channels/signals in the current uplink sub-frame respectively with the transmit power of the respective uplink channels/signals in the current uplink sub-frame in each of the transmission time segments obtained after the power control, the uplink channels/signals are uplink channels/signals modulated by BPSK or QPSK in the current uplink sub-frame.

The preset maximum transmit power in an embodiment includes the maximum transmit power allowed by the user equipment and/or the maximum transmit power allowed in each of the frequency bands.

Due to different timing advance corresponding to respective uplink channels/signals in an uplink sub-frame, in embodiments of the invention, transmission time of uplink channels/signals in an uplink sub-frame are divided into multiple transmission time segments, and power control is performed in each of the transmission time segments on the respective uplink channels/signals in the uplink sub-frame to satisfy that the sum of transmit power, obtained after the power control, of the uplink channels/signals transmitted in the transmission time segment does not exceed preset maximum transmit power of a user equipment and thus a system can operate normally. In the embodiments of the invention, uplink channels to be scaled down in power can be adapted in numerous schemes to uplink transmission with different priorities and/or in different bands.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the essence and scope of the invention. Thus the invention is also intended to encompass these modifications and variations thereto so long as the modifications and variations come into the scope of the claims appended to the invention and their equivalents.

What is claimed is:

1. A method of controlling uplink power comprising:
a user equipment determining target transmit power of each of at least one of uplink channels and uplink signals transmitted in a current uplink sub-frame;
the user equipment dividing transmission time of at least one of the uplink channels and the uplink signals in the current uplink sub-frame into multiple transmission time segments, wherein at least one of the uplink channels and the uplink signals comprised in any one of the transmission time segments are the same at any time, and at least one of the uplink channels and the uplink signals comprised in any one of the transmission time segments are different from at least one of the uplink channels and the uplink signals comprised in any other one of the transmission time segments; and
the user equipment performing power control, in each of the transmission time segments, on target transmit power of at least one of the uplink channels and the uplink signals transmitted in the transmission time segment to satisfy that a sum of transmit power, obtained after the power control, of at least one of the uplink channels and the uplink signals transmitted in the transmission time segment does not exceed preset maximum transmit power of the user equipment;
wherein the user equipment performing power control, in each of the transmission time segments, on target transmit power of at least one of the uplink channels and the uplink signals transmitted in the transmission time segment comprises:
the user equipment determining, in each of the transmission time segments, whether a sum of target transmit power of at least one of the uplink channels and the uplink signals in the current uplink sub-frame transmitted in the transmission time segment and transmit power of at least other uplink channels and other uplink signals transmitted in the transmission time segment exceeds the preset maximum transmit power; and
when exceeding is determined, the user equipment performing power control on the target transmit power of at least one of the uplink channels and the uplink signals transmitted in the transmission time segment to satisfy that a sum of transmit power, obtained after the power control, of at least one of the uplink channels and the uplink signals in the current uplink sub-frame and the transmit power, obtained after the power control, of at least one of the other uplink channels and the other uplink signals, in the transmission time segment does not exceed the preset maximum transmit power, wherein at least one of the other uplink channels and the other uplink signals comprise at least one of at least one of the uplink channels and the uplink signals in a preceding adjacent uplink sub-frame to the current uplink sub-frame, and at least one of the uplink channels and the uplink signals in a succeeding adjacent uplink sub-frame to the current uplink sub-frame transmitted in the transmission time segment; and when no exceeding is determined, the user equipment determining the target transmit power of at least one of the uplink channels and the uplink signals in the current uplink sub-frame as the transmit power of at least one of the uplink channels and the uplink signals in the transmission time segment;

wherein when exceeding is determined, the user equipment performing power control on the target transmit power of at least one of the uplink channels and the uplink signals transmitted in the transmission time segment to satisfy that the sum of the transmit power, obtained after the power control, of at least one of the uplink channels and the uplink signals in the current uplink sub-frame and the transmit power, obtained after the power control, of at least one of the other uplink channels and the other uplink signals transmitted in the transmission time segment does not exceed the preset maximum transmit power comprises:

the user equipment performing power control on the target transmit power of at least one of the uplink channels and the uplink signals in the current uplink sub-frame transmitted in the transmission time segment based upon the transmit power of at least one of the other uplink channels and the other uplink signals transmitted in the transmission time segment to satisfy that a sum of the transmit power, obtained after the power control, of at least one of the uplink channels and the uplink signals in the current uplink sub-frame in the transmission time segment does not exceed currently available maximum transmit power, wherein the currently available maximum transmit power is the preset maximum transmit power minus the transmit power of at least one of the other uplink channels and the other uplink signals, and at least one of the other uplink channels and the other uplink signals comprise at least one of at least one of the uplink channels and the uplink signals in the preceding adjacent uplink sub-frame to the current uplink sub-frame, and at least one of the uplink channels and the uplink signals in the succeeding adjacent uplink sub-frame to the current uplink sub-frame transmitted in the transmission time segment; or the user equipment performing power control on target transmit power of at least one of the other uplink channels and the other uplink signals transmitted in the transmission time segment and the target transmit power of at least one of the uplink channels and the uplink signals in the current uplink sub-frame, transmitted in the transmission time segment, to satisfy that the sum of the transmit power, obtained after the power control, of at least one of the uplink channels and the uplink signals in the current uplink sub-frame and the transmit power, obtained after the power control, of at least one of the other uplink channels and the other uplink signals, in the transmission time segment does not exceed the preset maximum transmit power, wherein at least one of the other uplink channels and the other uplink signals comprise at least one of at least one of the uplink channels and the uplink signals in the preceding adjacent uplink sub-frame to the current uplink sub-frame, and at least one of the uplink channels and the uplink signals in the succeeding adjacent uplink sub-frame to the current uplink sub-frame transmitted in the transmission time segment.

2. The method of claim 1, wherein the user equipment dividing the transmission time of at least one of the uplink channels and the uplink signals in the current uplink sub-frame into the multiple transmission time segments comprises: the user equipment dividing the transmission time of at least one of the uplink channels and the uplink signals in the current uplink sub-frame into the multiple transmission time segments, according to timing advance corresponding to at least one of the respective uplink channels and the respective uplink signals, wherein the number of transmission time segments is the number of uplink carriers, aggregated by the user equipment or activated, with different timing advance plus one.

3. The method of claim 1, wherein the user equipment performing power control, in each of the transmission time segments, on the target transmit power of at least one of the uplink channels and the uplink signals, for which power control is required, transmitted in the transmission time segment comprises:

the user equipment scaling down the target transmit power of at least one of the uplink channels and the uplink signals, for which power control is required, transmitted in the transmission time segment, with an equal proportion to determine the transmit power of at least one of the uplink channels and the uplink signals in the transmission time segment obtained after the power control; or the user equipment scaling down the target transmit power of at least one of the uplink channels and the uplink signals, for which power control is required, transmitted in the transmission time segment, sequentially in an order of ascending channel/signal priorities, and scaling down target transmit power of at least one of multiple uplink channels and multiple uplink signals with the same channel/signal priority with an equal proportion to determine the transmit power of at least one of the uplink channels and the uplink signals in the transmission time segment obtained after the power control, wherein target transmit power of at least one of the uplink channels and the uplink signals without power scaling down are determined as the transmit power of at least one of the uplink channels and the uplink signals in the transmission time segment obtained after the power control; or the user equipment scaling down target transmit power of at least one of the uplink channels and the uplink signals in the same frequency band among at least one of the uplink channels and the uplink signals, for which power control is required, transmitted in the transmission time segment, with an equal proportion, and scaling down target transmit power of at least one of the uplink channels and the uplink signals in different frequency bands among at least one of the uplink channels and the uplink signals, for which power control is required, transmitted in the transmission time segment, with power scaling down factors corresponding to the frequency bands to determine the transmit power of at least one of the respective uplink channels and the respective uplink signals in the transmission time segment obtained after the power control; or the user equipment scaling down, sequentially in an order of ascending channel/signal priorities, target transmit power of at least one of the uplink channels and the uplink signals, in the same frequency band, with the same channel/signal priority among at least one of the uplink channels and the uplink signals, for which power control is required, transmitted in the transmission time segment, with an equal proportion, and target transmit power of at least one of the uplink channels and the uplink signals, in different frequency bands, with the same channel/signal priority among at least one of the uplink channels and the uplink signals, for which power control is required, transmitted in the transmission time segment, with power scaling down factors corresponding to the frequency bands to determine the transmit power of at least one of the respective uplink channels and the respective uplink signals in the transmission time segment obtained after the power control, wherein target transmit power of at least one of the uplink channels and the uplink signals with a power scaling down factor of 1 are determined as the transmit power of at least one of the uplink channels and the uplink signals in the transmission time segment obtained after the power control, and target transmit power of at least one of the uplink channels and the uplink signals without power scaling down are determined as the transmit power of at least one of the uplink channels and the uplink signals in the transmission time segment obtained after the power control; and wherein at least one of the uplink channels and the uplink signals for which power scaling down is required are at least one of the uplink channels and the uplink signals in the current uplink sub-frame transmitted in the transmission time segment or at least one of the uplink channels and the uplink signals in the current uplink sub-frame transmitted in the transmission time segment and at least one of the other uplink channels and the other uplink signals transmitted in the transmission time segment, and at least one of the other uplink channels and the other uplink signals comprise at least one of at least one of the uplink channels and the uplink signals in the preceding adjacent uplink sub-frame to the current uplink sub-frame, and at least one of the uplink channels and the uplink signals in the succeeding adjacent uplink sub-frame to the current uplink sub-frame transmitted in the transmission time segment.

4. The method of claim 3, wherein the channel/signal priorities are:
a Physical Uplink Control Channel, PUCCH >a Physical Uplink Shared Channel, PUSCH, with Unlink Control Information, UCI >a PUSCH without UCI >a Sounding Reference Signal, SRS; or
a PUCCH >a PUSCH with UCI >a PUSCH without UCI =an SRS; or
if there is a Physical Random Access Channel, PRACH, then:
a PRACH >a PUCCH >a PUSCH with UCI >a PUSCH without UCI >an SRS; or
a PRACH >a PUCCH >a PUSCH with UCI >a PUSCH without UCI =an SRS; or
a PUCCH >a PRACH >a PUSCH with UCI >a PUSCH without UCI >an SRS; or
a PUCCH >a PRACH >a PUSCH with UCI >a PUSCH without UCI =an SRS.

5. The method of claim 1, further comprising: after the user equipment performs power control, in each of the transmission time segments, on the target transmit power of at least one of the uplink channels and the uplink signals transmitted in the transmission time segment,
the user equipment determining the lowest value among the transmit power of at least one of the uplink channels and the uplink signals in the current uplink sub-frame in the respective transmission time segments as the transmit power of at least one of the uplink channels and the uplink signals in the respective transmission time segments in the current uplink sub-frame, and transmitting at least one of the respective uplink channels and the respective uplink signals in the current uplink sub-frame with the transmit power; or
the user equipment transmitting at least one of the uplink channels and the uplink signals in the current uplink sub-frame respectively with the transmit power of at least one of the uplink channels and the uplink signals in the current uplink sub-frame in each of the transmission time segments obtained after the power control.

6. The method of claim 5, wherein when the user equipment transmits at least one of the uplink channels and the uplink signals in the current uplink sub-frame respectively with the transmit power of at least one of the uplink channels and the uplink signals in the current uplink sub-frame in each of the transmission time segments obtained after the power control, at least one of the uplink channels and the uplink signals are at least one of the uplink channels and the uplink signals modulated by Binary Phase Shift Keying, BPSK, or Quadrature Phase Shift Keying, QPSK, in the current uplink sub-frame.

7. The method of claim 1, wherein the preset maximum transmit power comprises at least one of maximum transmit power allowed by the user equipment and maximum transmit power allowed in each of frequency bands.

8. A user equipment comprising:
a target power calculation module configured for the user equipment to determine target transmit power of each of at least one of uplink channels and uplink signals transmitted in a current uplink sub-frame;
a time segment division module to divide transmission time of at least one of the uplink channels and the uplink signals in the current uplink sub-frame into multiple transmission time segments, wherein at least one of the uplink channels and the uplink signals comprised in any one of the transmission time segments are the same at any time, and at least one of the uplink channels and the uplink signals comprised in any one of the transmission time segments are different from at least one of the uplink channels and the uplink signals comprised in any other one of the transmission time segments; and
a power control module to perform power control, in each of the transmission time segments, on target transmit power of at least one of the uplink channels and the uplink signals transmitted in the transmission time segment to satisfy that a sum of transmit power, obtained after the power control, of at least one of the uplink channels and the uplink signals transmitted in the transmission time segment does not exceed preset maximum transmit power of the user equipment;
wherein the power control module is further configured:
to determine, in each of the transmission time segments, whether a sum of target transmit power of at least one of the uplink channels and the uplink signals in the current uplink sub-frame transmitted in the transmission time segment and transmit power of at least one of other uplink channels and other uplink signals transmitted in the transmission time segment exceeds the preset maximum transmit power; and
when exceeding is determined, to perform power control on the target transmit power of at least one of the uplink channels and the uplink signals transmitted in the transmission time segment to satisfy that a sum of transmit power, obtained after the power control, of at least one of the uplink channels and the uplink signals in the current uplink sub-frame and the transmit power, obtained after the power control, of at least one of the other uplink channels and the other uplink signals, in the transmission time segment does not exceed the preset maximum transmit power, wherein at least one of the other uplink channels and the other uplink signals comprise at least one of at least one of the uplink channels and the uplink signals in a preceding adjacent uplink sub-frame to the current uplink sub-frame, and at least one of the uplink channels and the uplink signals in a succeeding adjacent uplink sub-frame to the current uplink sub-frame transmitted in the transmission time segment; and when no exceeding is determined, to determine the target transmit power of the uplink channel/signals in the current uplink sub-frame as the transmit power of at least one of the uplink channels and the uplink signals in the transmission time segment;

wherein when exceeding is determined, the power control module is further configured:

to perform power control on the target transmit power of at least one of the uplink channels and the uplink signals in the current uplink sub-frame transmitted in the transmission time segment based upon the transmit power of at least one of the other uplink channels and the other uplink signals transmitted in the transmission time segment to satisfy that a sum of the transmit power, obtained after the power control, of at least one of the uplink channels and the uplink signals in the current uplink sub-frame in the transmission time segment does not exceed currently available maximum transmit power, wherein the currently available maximum transmit power is the preset maximum transmit power minus the transmit power of at least one of the other uplink channels and the other uplink signals, and at least one of the other uplink channels and the other uplink signals comprise at least one of at least one of the uplink channels and the uplink signals in the preceding adjacent uplink sub-frame to the current uplink sub-frame, and at least one of the uplink channels and the uplink signals in the succeeding adjacent uplink sub-frame to the current uplink sub-frame transmitted in the transmission time segment; or to perform power control on target transmit power of at least one of the other uplink channels and the other uplink signals transmitted in the transmission time segment and the target transmit power of at least one of the uplink channels and the uplink signals in the current uplink sub-frame, transmitted in the transmission time segment, to satisfy that the sum of the transmit power, obtained after the power control, of at least one of the uplink channels and the uplink signals in the current uplink sub-frame and the transmit power, obtained after the power control, of at least one of the other uplink channels and the other uplink signals, in the transmission time segment does not exceed the preset maximum transmit power, wherein at least one of the other uplink channels and the other uplink signals comprise at least one of at least one of the uplink channels and the uplink signals in the preceding adjacent uplink sub-frame to the current uplink sub-frame, and at least one of the uplink channels and the uplink signals in the succeeding adjacent uplink sub-frame to the current uplink sub-frame transmitted in the transmission time segment.

9. The user equipment of claim 8, wherein the time segment division module is configured to divide the transmission time of at least one of the uplink channels and the uplink signals in the current uplink sub-frame into the multiple transmission time segments according to timing advance corresponding to at least one of the respective uplink channels and the respective uplink signals, wherein the number of transmission time segments is the number of uplink carriers, aggregated by the user equipment or activated, with different timing advance plus one.

10. The user equipment of claim 8, wherein the power control module configured to perform power control, in each of the transmission time segments, on the target transmit power of at least one of the uplink channels and the uplink signals, for which power control is required, transmitted in the transmission time segment is further configured:

to scale down the target transmit power of at least one of the uplink channels and the uplink signals, for which power control is required, transmitted in the transmission time segment with an equal proportion to determine the transmit power of at least one of the uplink channels and the uplink signals in the transmission time segment obtained after the power control; or to scale down the target transmit power of at least one of the uplink channels and the uplink signals, for which power control is required, transmitted in the transmission time segment, sequentially in an order of ascending channel/signal priorities, and to scale down target transmit power of at least one of multiple uplink channels and multiple uplink signals with the same channel/signal priority with an equal proportion to determine the transmit power of at least one of the uplink channels and the uplink signals in the transmission time segment obtained after the power control, wherein target transmit power of at least one of the uplink channels and the uplink signals without power scaling down are determined as the transmit power of at least one of the uplink channels and the uplink signals in the transmission time segment obtained after the power control; or to scale down target transmit power of at least one of the uplink channels and the uplink signals in the same frequency band among at least one of the uplink channels and the uplink signals, for which power control is required, transmitted in the transmission time segment, with an equal proportion, and to scale down target transmit power of at least one of the uplink channels and the uplink signals in different frequency bands among at least one of the uplink channels and the uplink signals, for which power control is required, transmitted in the transmission time segment, with power scaling down factors corresponding to the frequency bands to determine the transmit power of at least one of the respective uplink channels and the respective uplink signals in the transmission time segment obtained after the power control; or to scale down, sequentially in an order of ascending channel/signal priorities, target transmit power of at least one of the uplink channels and the uplink signals, in the same frequency band, with the same channel/signal priority among at least one of the uplink channels and the uplink signals, for which power control is required, transmitted in the transmission time segment, with an equal proportion, and target transmit power of at least one of the uplink channels and the uplink signals, in different frequency bands, with the same channel/signal priority among at least one of the uplink channels and the uplink signals, for which power control is required, transmitted in the transmission time segment, with power scaling down factors corresponding to the frequency bands to determine the transmit power of at least one of the respective uplink channels and the respective uplink signals in the transmission time segment obtained after the power control, wherein target transmit power of at least one of the uplink channels and the uplink signals with a power scaling down factor of 1 are determined as the transmit power of at least one of the uplink channels and the uplink signals in the transmission time segment obtained after the power control, and target transmit power of at least one of the uplink channels and the uplink signals without power scaling down are determined as the transmit power of at least one of the uplink channels and the uplink signals in the transmission time segment obtained after the power control; and wherein at least one of the uplink channels and the uplink signals for which power scaling down is required are at least one of the uplink channels and the uplink signals in the current uplink sub-frame transmitted in the transmission time segment or at least one of the uplink channels and the uplink signals in the current uplink sub-frame transmitted in the transmission time segment and at least one of the other uplink channels and the other uplink signals transmitted in the transmission time segment, and at least one of the other uplink channels and the other uplink signals comprise at least one of at least one of the uplink channels and the uplink signals in the preceding adjacent uplink sub-frame to the current uplink sub-frame, and at least one of the uplink channels and the uplink signals in the succeeding adjacent uplink sub-frame to the current uplink sub-frame transmitted in the transmission time segment.

11. The user equipment of claim 8, wherein the power control module configured to perform power control, in each of the transmission time segments, on the target transmit power of at least one of the uplink channels and the uplink signals transmitted in the transmission time segment is further configured:

to determine the lowest value among the transmit power, obtained after the power control, of at least one of the uplink channels and the uplink signals in the current uplink sub-frame in the respective transmission time segments as the transmit power of at least one of the uplink channels and the uplink signals in the respective transmission time segments in the current uplink sub-frame, and to transmit at least one of the respective uplink channels and the respective uplink signals in the current uplink sub-frame with the transmit power; or to transmit at least one of the uplink channels and the uplink signals in the current uplink sub-frame respectively with transmit power of at least one of the uplink channels and the uplink signals in the current uplink sub-frame in each of the transmission time segments obtained after the power control.

12. The method of claim 1, wherein the user equipment performing power control, in each of the transmission time segments, on the target transmit power of at least one of the uplink channels and the uplink signals, for which power control is required, transmitted in the transmission time segment comprises:

the user equipment scaling down the target transmit power of at least one of the uplink channels and the uplink signals, for which power control is required, transmitted in the transmission time segment, with an equal proportion to determine the transmit power of at least one of the uplink channels and the uplink signals in the transmission time segment obtained after the power control; or the user equipment scaling down the target transmit power of at least one of the uplink channels and the uplink signals, for which power control is required, transmitted in the transmission time segment, sequentially in an order of ascending channel/signal priorities, and scaling down target transmit power of at least one of multiple uplink channels and multiple uplink signals with the same channel/signal priority with an equal proportion to determine the transmit power of at least one of the uplink channels and the uplink signals in the transmission time segment obtained after the power control, wherein target transmit power of at least one of the uplink channels and the uplink signals without power scaling down are determined as the transmit power of at least one of the uplink channels and the uplink signals in the transmission time segment obtained after the power control; or the user equipment scaling down target transmit power of at least one of the uplink channels and the uplink signals in the same frequency band among at least one of the uplink channels and the uplink signals, for which power control is required, transmitted in the transmission time segment, with an equal proportion, and scaling down target transmit power of at least one of the uplink channels and the uplink signals in different frequency bands among at least one of the uplink channels and the uplink signals, for which power control is required, transmitted in the transmission time segment, with power scaling down factors corresponding to the frequency bands to determine the transmit power of at least one of the respective uplink channels and the respective uplink signals in the transmission time segment obtained after the power control; or the user equipment scaling down, sequentially in an order of ascending channel/signal priorities, target transmit power of at least one of the uplink channels and the uplink signals, in the same frequency band, with the same channel/signal priority among at least one of the uplink channels and the uplink signals, for which power control is required, transmitted in the transmission time segment, with an equal proportion, and target transmit power of at least one of the uplink channels and the uplink signals, in different frequency bands, with the same channel/signal priority among at least one of the uplink channels and the uplink signals, for which power control is required, transmitted in the transmission time segment, with power scaling down factors corresponding to the frequency bands to determine the transmit power of at least one of the respective uplink channels and the respective uplink signals in the transmission time segment obtained after the power control, wherein target transmit power of at least one of the uplink channels and the uplink signals with a power scaling down factor of 1 are determined as the transmit power of at least one of the uplink channels and the uplink signals in the transmission time segment obtained after the power control, and target transmit power of at least one of the uplink channels and the uplink signals without power scaling down are determined as the transmit power of at least one of the uplink channels and the uplink signals in the transmission time segment obtained after the power control; and wherein at least one of the uplink channels and the uplink signals for which power scaling down is required are at least one of the uplink channels and the uplink signals in the current uplink sub-frame transmitted in the transmission time segment or at least one of the uplink channels and the uplink signals in the current uplink sub-frame transmitted in the transmission time segment and at least one of the other uplink channels and the other uplink signals transmitted in the transmission time segment, and at least one of the other uplink channels and the other uplink signals comprise at least one of at least one of the uplink channels and the uplink signals in the preceding adjacent uplink sub-frame to the current uplink sub-frame, and at least one of the uplink channels and the uplink signals in the succeeding adjacent uplink sub-frame to the current uplink sub-frame transmitted in the transmission time segment.

13. The method of claim 12, wherein the channel/signal priorities are:
a Physical Uplink Control Channel, PUCCH >a Physical Uplink Shared Channel, PUSCH, with Unlink Control Information, UCI >a PUSCH without UCI >a Sounding Reference Signal, SRS; or
a PUCCH >a PUSCH with UCI >a PUSCH without UCI =an SRS; or
if there is a Physical Random Access Channel, PRACH, then:
a PRACH >a PUCCH >a PUSCH with UCI >a PUSCH without UCI >an SRS; or
a PRACH >a PUCCH >a PUSCH with UCI >a PUSCH without UCI =an SRS; or
a PUCCH >a PRACH >a PUSCH with UCI >a PUSCH without UCI >an SRS; or
a PUCCH >a PRACH >a PUSCH with UCI >a PUSCH without UCI =an SRS.

14. The user equipment of claim 8, wherein the power control module configured to perform power control, in each of the transmission time segments, on the target transmit power of at least one of the uplink channels and the uplink signals, for which power control is required, transmitted in the transmission time segment is further configured:
to scale down the target transmit power of at least one of the uplink channels and the uplink signals, for which power control is required, transmitted in the transmission time segment with an equal proportion to determine the transmit power of at least one of the uplink channels and the uplink signals in the transmission time segment obtained after the power control; or
to scale down the target transmit power of at least one of the uplink channels and the uplink signals, for which power control is required, transmitted in the transmission time segment, sequentially in an order of ascending channel/signal priorities, and to scale down target transmit power of at least one of multiple uplink channels and multiple uplink signals with the same channel/signal priority with an equal proportion to determine the transmit power of at least one of the uplink channels and the uplink signals in the transmission time segment obtained after the power control, wherein target transmit power of at least one of the uplink channels and the uplink signals without power scaling down are determined as the transmit power of at least one of the uplink channels and the uplink signals in the transmission time segment obtained after the power control; or to scale down target transmit power of at least one of the uplink channels and the uplink signals in the same frequency band among at least one of the uplink channels and the uplink signals, for which power control is required, transmitted in the transmission time segment, with an equal proportion, and to scale down target transmit power of at least one of the uplink channels and the uplink signals in different frequency bands among at least one of the uplink channels and the uplink signals, for which power control is required, transmitted in the transmission time segment, with power scaling down factors corresponding to the frequency bands to determine the transmit power of at least one of the respective uplink channels and the respective uplink signals in the transmission time segment obtained after the power control; or to scale down, sequentially in an order of ascending channel/signal priorities, target transmit power of at least one of the uplink channels and the uplink signals, in the same frequency band, with the same channel/signal priority among at least one of the uplink channels and the uplink signals, for which power control is required, transmitted in the transmission time segment, with an equal proportion, and target transmit power of at least one of the uplink channels and the uplink signals, in different frequency bands, with the same channel/signal priority among at least one of the uplink channels and the uplink signals, for which power control is required, transmitted in the transmission time segment, with power scaling down factors corresponding to the frequency bands to determine the transmit power of at least one of the respective uplink channels and the respective uplink signals in the transmission time segment obtained after the power control, wherein target transmit power of at least one of the uplink channels and the uplink signals with a power scaling down factor of 1 are determined as the transmit power of at least one of the uplink channels and the uplink signals in the transmission time segment obtained after the power control, and target transmit power of at least one of the uplink channels and the uplink signals without power scaling down are determined as the transmit power of at least one of the uplink channels and the uplink signals in the transmission time segment obtained after the power control; and wherein at least one of the uplink channels and the uplink signals for which power scaling down is required are at least one of the uplink channels and the uplink signals in the current uplink sub-frame transmitted in the transmission time segment or at least one of the uplink channels and the uplink signals in the current uplink sub-frame transmitted in the transmission time segment and at least one of the other uplink channels and the other uplink signals transmitted in the transmission time segment, and at least one of the other uplink channels and the other uplink signals comprise at least one of at least one of the uplink channels and the uplink signals in the preceding adjacent uplink sub-frame to the current uplink sub-frame, and at least one of the uplink channels and the uplink signals in the succeeding adjacent uplink sub-frame to the current uplink sub-frame transmitted in the transmission time segment.

* * * * *